United States Patent
Yoshii et al.

(10) Patent No.: US 11,169,875 B2
(45) Date of Patent: Nov. 9, 2021

(54) NONVOLATILE SEMICONDUCTOR MEMORY DEVICE

(71) Applicant: Toshiba Memory Corporation, Minato-ku (JP)

(72) Inventors: Kenichiro Yoshii, Tokyo (JP); Shinichi Kanno, Tokyo (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/561,399

(22) Filed: Sep. 5, 2019

(65) Prior Publication Data

US 2020/0264805 A1   Aug. 20, 2020

(30) Foreign Application Priority Data

Feb. 14, 2019  (JP) .............................. JP2019-024588

(51) Int. Cl.
*G06F 11/10* (2006.01)
*G06F 3/06* (2006.01)
*G06F 12/1009* (2016.01)

(52) U.S. Cl.
CPC .......... *G06F 11/1068* (2013.01); *G06F 3/064* (2013.01); *G06F 3/0604* (2013.01); *G06F 3/065* (2013.01); *G06F 3/0656* (2013.01); *G06F 3/0659* (2013.01); *G06F 3/0679* (2013.01); *G06F 12/1009* (2013.01); *G06F 2212/1044* (2013.01)

(58) Field of Classification Search
CPC .... G06F 11/1068; G06F 3/064; G06F 3/0656; G06F 3/0679
See application file for complete search history.

(56) References Cited

U.S. PATENT DOCUMENTS

| 8,041,882 | B2 | 10/2011 | Jachalsky et al. |
| 10,452,535 | B2* | 10/2019 | Lin ..................... G06F 12/1009 |
| 2006/0153025 | A1* | 7/2006 | Iida .................... G06F 12/0246 369/47.1 |
| 2007/0253249 | A1* | 11/2007 | Kang .................. G11C 11/5628 365/185.03 |
| 2007/0276986 | A1* | 11/2007 | Honda ................ G06F 12/0246 711/103 |
| 2009/0157950 | A1* | 6/2009 | Selinger .................. G06F 12/08 711/103 |

(Continued)

FOREIGN PATENT DOCUMENTS

| JP | 5248803 B2 | 7/2013 |
| JP | 2015-018451 A | 1/2015 |
| JP | 2017-162065 A | 9/2017 |

*Primary Examiner* — Joseph D Torres

(74) *Attorney, Agent, or Firm* — Oblon, McClelland, Maier & Neustadt, L.L.P.

(57) ABSTRACT

According to one embodiment, a nonvolatile semiconductor memory device is connectable to a controller. The nonvolatile semiconductor memory device includes a cell array and a control circuit. The cell array includes a plurality of blocks. The control circuit executes program operations for a plurality of pages included in a write destination block of the blocks, in a certain program order. The write destination block is selected by the controller from the blocks. The control circuit is configured to notify a page address corresponding to a next program operation with respect to the write destination block to the controller.

26 Claims, 21 Drawing Sheets

(56) References Cited

U.S. PATENT DOCUMENTS

| | | | |
|---|---|---|---|
| 2009/0310413 A1* | 12/2009 | Lasser | G11C 16/0483 365/185.12 |
| 2013/0003480 A1* | 1/2013 | D'Abreu | G11C 29/04 365/218 |
| 2015/0019933 A1 | 1/2015 | Yamazaki et al. | |
| 2017/0262175 A1* | 9/2017 | Kanno | G06F 3/0679 |
| 2017/0262365 A1 | 9/2017 | Kanno | |

* cited by examiner

Program order table

| WL no. | 1st | 2nd | 3rd |
|---|---|---|---|
| 0 | 0 / 0 | 1 / 2 | 2 / 5 |
| 1 | 3 / 1 | 4 / 4 | 5 / 8 |
| 2 | 6 / 3 | 7 / 7 | 8 / 11 |
| 3 | 9 / 6 | 10 / 10 | 11 / 14 |
| 4 | 12 / 9 | 13 / 13 | 14 / 17 |

Page address 42
Program order 41

F I G. 4

Buffer management table

| Buffer number 51 | 0 | 1 | 2 | 3 | 4 | 5 |
|---|---|---|---|---|---|---|
| Valid/invalid 52 | | | | | | |
| Block address 53 | | | | | | |
| Page address 54 | | | | | | |
| Data required period 55 | | | | | | |

F I G. 5

Block write state management table

| Block address 61 | 0 | 1 | 2 | 3 | 4 | 5 |
|---|---|---|---|---|---|---|
| Writing flag 62 | | | | | | |
| Next program order number 63 | | | | | | |
| Completed program order number 64 | | | | | | |

F I G. 6

Buffer management table

| Buffer number 51 | 0 | 1 | 2 | 3 | 4 | 5 | 6 |
|---|---|---|---|---|---|---|---|
| Valid/invalid 52 | V | V | V | V | V | V | IV |
| Block address 53 | 0 | 0 | 0 | 0 | 0 | 0 | |
| Page address 54 | 0 | 3 | 1 | 6 | 4 | 2 | |
| Data required period 55 | 5 | 8 | 5 | 11 | 8 | 5 | |

F I G. 8

Block write state management table

| Block address 61 | 0 | 1 | 2 | 3 | 4 | 5 | 6 |
|---|---|---|---|---|---|---|---|
| Writing flag 62 | Y | N | N | N | N | N | N |
| Next program order number 63 | 6 | | | | | | |
| Completed program order number 64 | 5 | | | | | | |

F I G. 9

| Buffer management table | | | | | | | | |
|---|---|---|---|---|---|---|---|---|
| Buffer number 51 | 0 | 1 | 2 | 3 | 4 | 5 | 6 | |
| Valid/invalid 52 | V | V | V | V | IV | IV | IV | |
| Block address 53 | 0 | 0 | 0 | 0 | | | | |
| Page address 54 | 0 | 1 | 2 | 3 | | | | |
| Data required period 55 | 5 | 5 | 5 | 8 | | | | |
F I G. 11
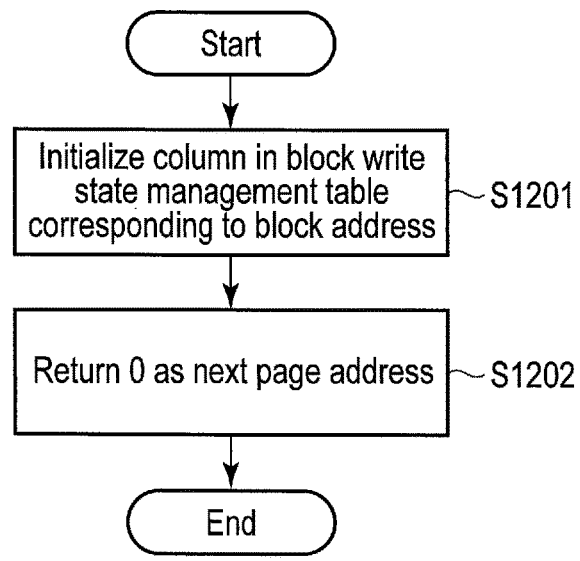
F I G. 12

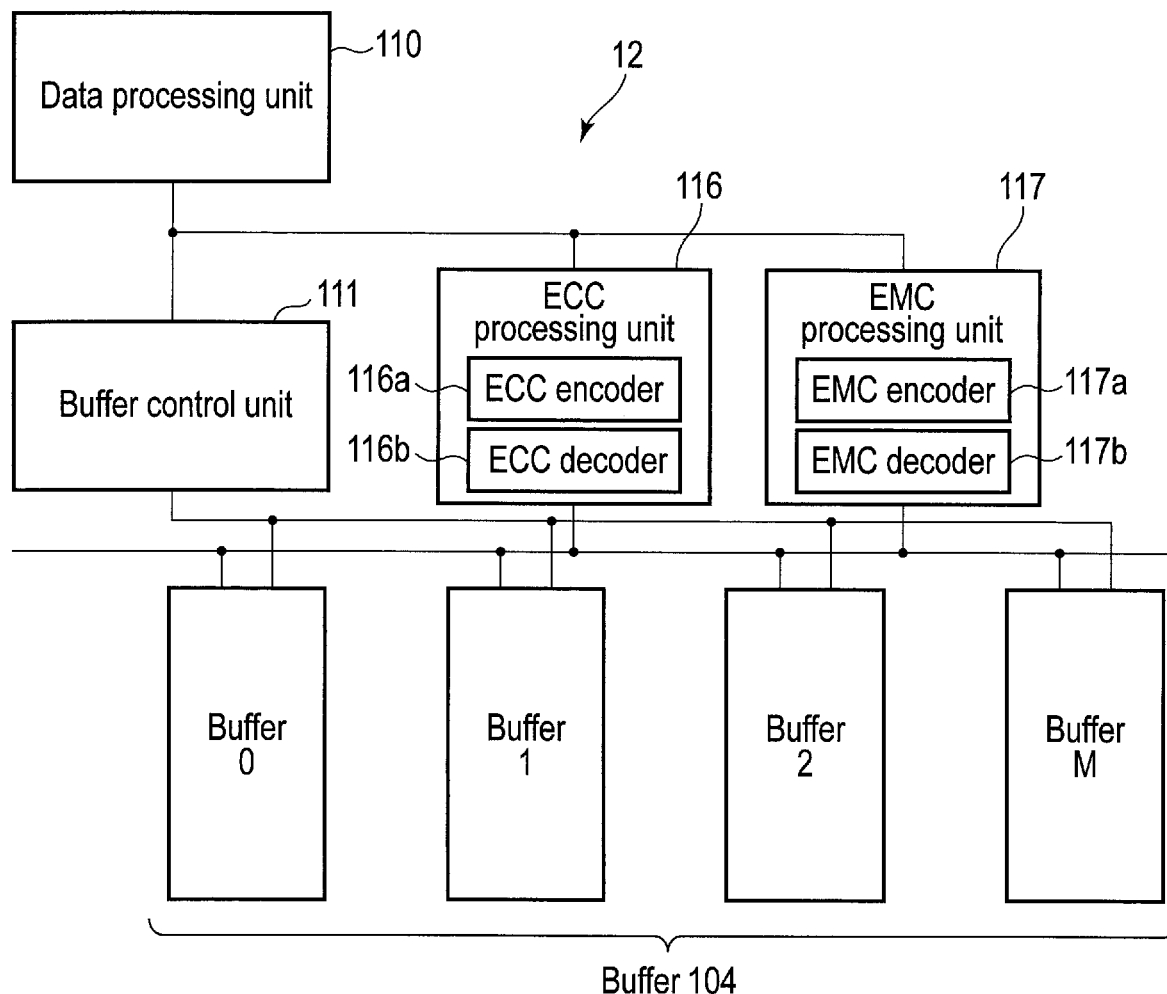
F I G. 17

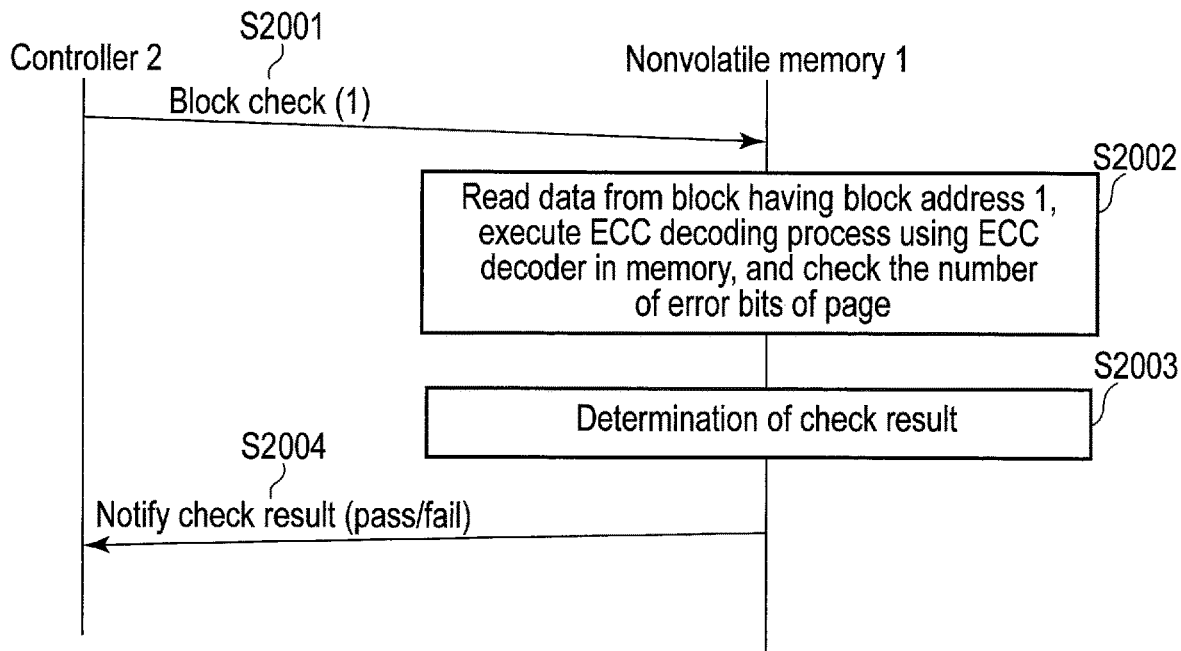
F I G. 20
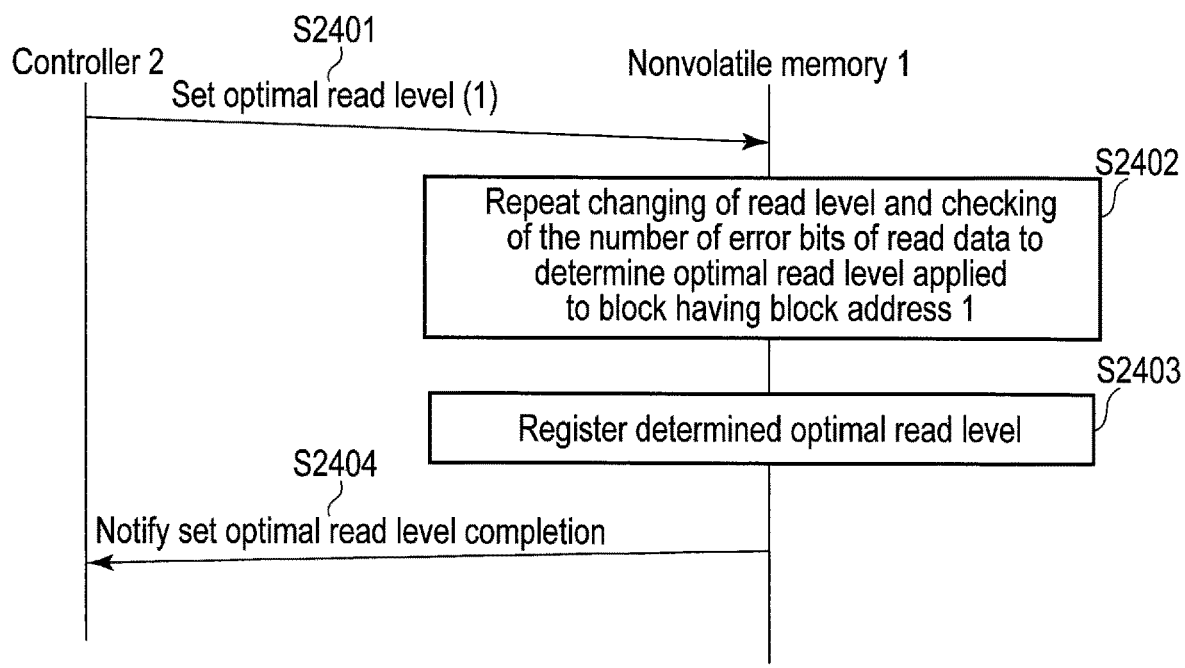
F I G. 24

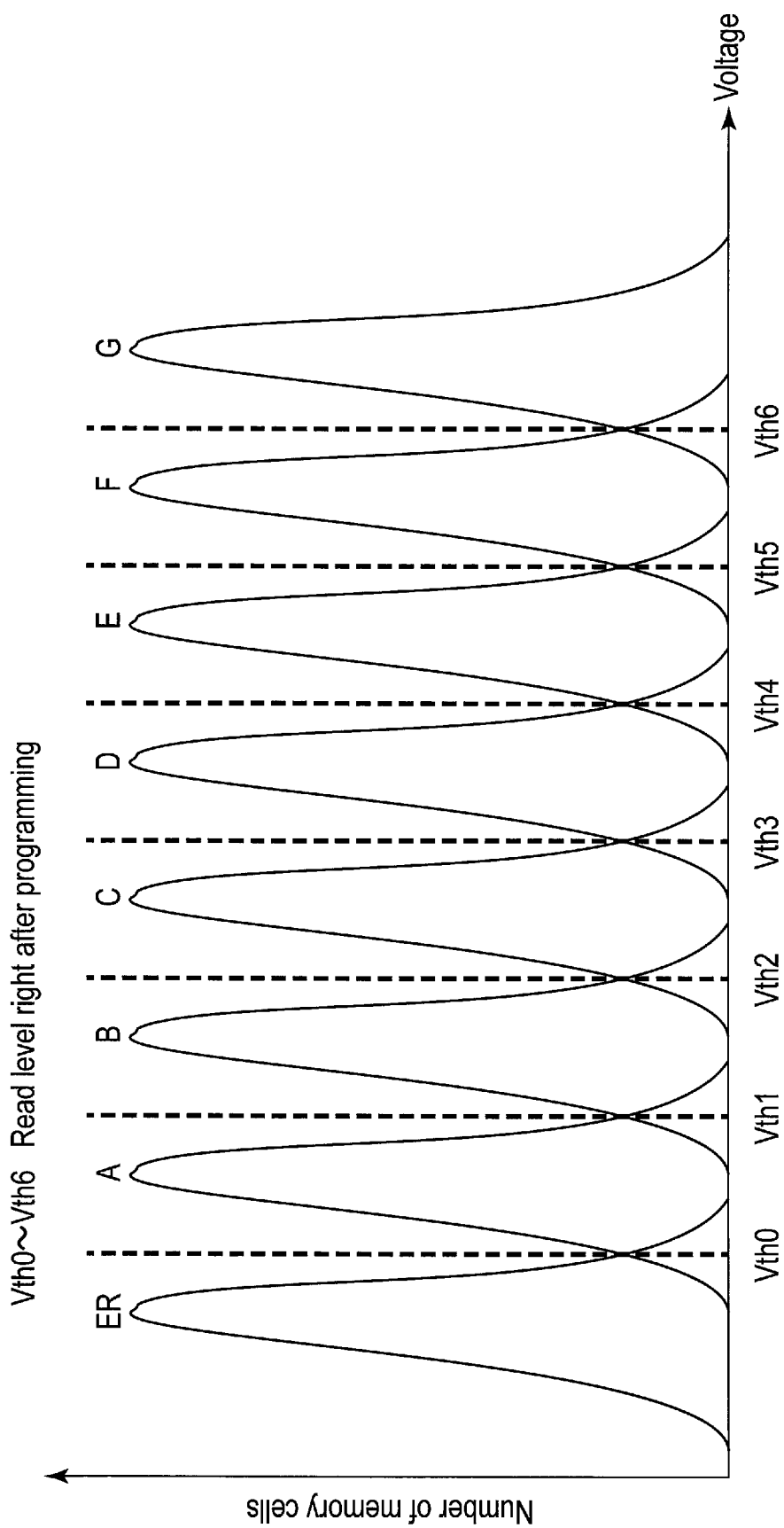
F I G. 21

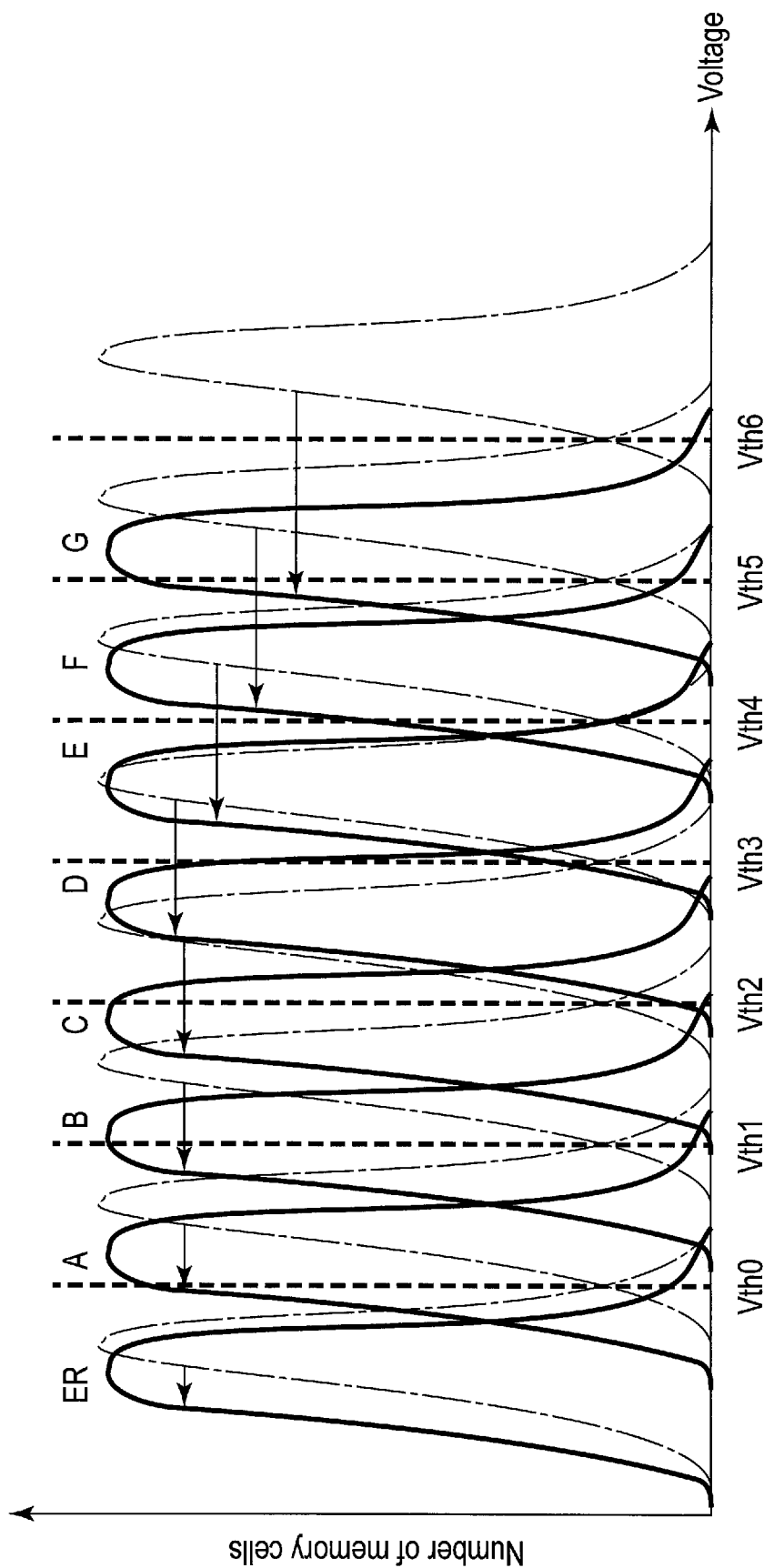
F I G. 22

NONVOLATILE SEMICONDUCTOR MEMORY DEVICE

CROSS-REFERENCE TO RELATED APPLICATIONS

This application is based upon and claims the benefit of priority from Japanese Patent Application No. 2019-024588, filed Feb. 14, 2019, the entire contents of which are incorporated herein by reference.

FIELD

Embodiments described herein relate generally to a nonvolatile semiconductor memory device such as a NAND flash memory.

BACKGROUND

In recent years, various kinds of nonvolatile semiconductor devices are used. As a typical example of the nonvolatile semiconductor memory devices, NAND flash memories are known.

As an example of interface used between the NAND flash memory and a controller which controls the NAND flash memory, open NAND flash interface (ONFi) is widely used. Communication between the NAND flash memory and the controller is performed, in general, in the following manner.

For example, in a data write operation (program operation), the controller determines a page to be accessed, and transfers a program request (program command), address, and data to the NAND flash memory. The NAND flash memory writes data received from the controller to the page designated by the address received from the controller, and returns a processing result to the controller.

BRIEF DESCRIPTION OF THE DRAWINGS

FIG. 4 is a diagram illustrating an example of a program order table defining a program order rule applied to a flash memory (triple level cell (TLC) flash memory) which stores 3-bit data in each memory cell.

FIG. 5 is a diagram illustrating an example of a structure of a buffer management table maintained and managed by a buffer control unit in the nonvolatile memory.

FIG. 6 is a diagram illustrating an example of a structure of a block write state management table maintained and managed by a data processor in the nonvolatile memory.

FIG. 8 is a diagram illustrating contents of the buffer management table at a certain point of time in a period when the data write process is being executed.

FIG. 9 is a diagram illustrating contents of the block write state management table at a certain point of time in a period when the data write process is being executed.

FIG. 11 is a diagram illustrating contents of the buffer management table at a certain point of time in a period when the data write process of FIG. 10 is being executed.

FIG. 12 is a flowchart illustrating a procedure of a process executed by the nonvolatile memory when a start of a write process to a block is notified from the controller.

FIG. 17 is a block diagram illustrating an ECC processing unit and an EMC processing unit which are included in a memory core control unit of the nonvolatile memory.

FIG. 20 is a sequence diagram illustrating a procedure of a process of checking the number of error bits, which is executed by the controller and the nonvolatile memory.

FIG. 21 is a diagram illustrating a relationship between eight threshold voltage distributions corresponding to 3-bit data value stored in each memory cell and seven read voltage levels used in reading data from each memory cell.

FIG. 22 is a diagram illustrating a state where each threshold voltage distribution of memory cell is shifted to a lower value in accordance with a time lapse after programming.

FIG. 24 is a sequence diagram illustrating a procedure of an optimal read voltage level determination process executed by the controller and the nonvolatile memory.

DETAILED DESCRIPTION

Various embodiments will be described hereinafter with reference to the accompanying drawings.

In general, according to one embodiment, a nonvolatile semiconductor memory device is connectable to a controller. The nonvolatile semiconductor memory device comprises a cell array including a plurality of blocks, and a control circuit configured to execute program operations for a plurality of pages included in a write destination block in a certain program order. The write destination block is selected by the controller from the blocks. The control circuit is configured to notify a page address corresponding to a next program operation with respect to the write destination block to the controller.

First Embodiment

Figure 1:
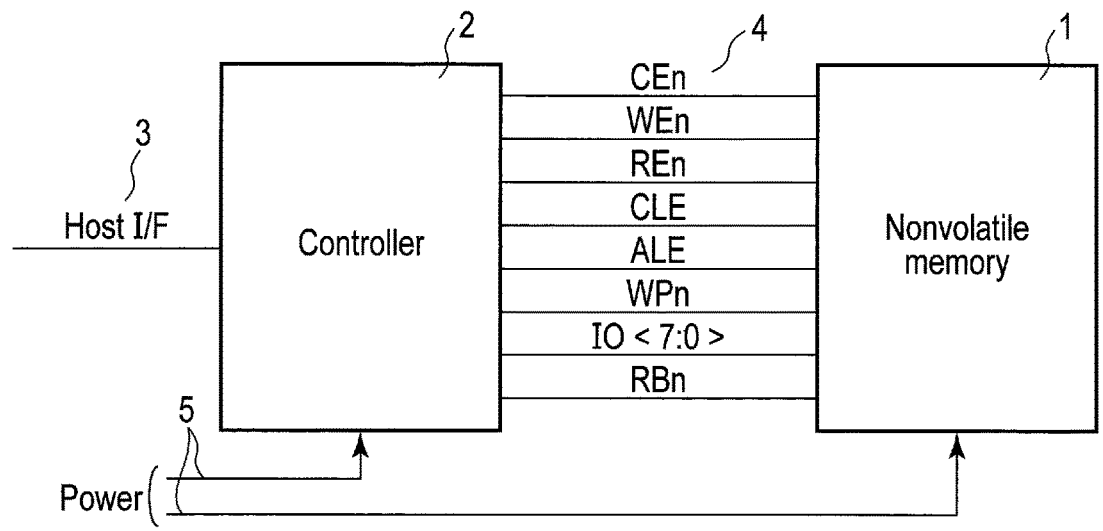
FIG. 1 is a block diagram illustrating an example of a structure of a memory system including a nonvolatile semiconductor memory device (nonvolatile memory) and a controller which controls the nonvolatile semiconductor memory device.

FIG. 1 illustrates an example of a structure of a memory system including a nonvolatile memory 1 of a first embodiment.

The nonvolatile memory 1 is a nonvolatile semiconductor memory device such as a NAND flash memory. The nonvolatile memory 1 may be a two-dimensional structure flash memory or a three-dimensional structure flash memory.

The memory system includes the nonvolatile memory 1 and a controller 2 which controls the nonvolatile memory 1. The controller 2 may be referred to as a first semiconductor device. Furthermore, the nonvolatile memory 1 may be referred to as a second semiconductor device. The memory system further includes a host interface 3, memory controller communication line 4, and power line 5.

The memory system may be realized as a solid state drive (SSD), for example. In this case, the SSD is used as a data storage of various information processing apparatuses such as a server computer, personal computer, and mobile device functioning as a host system (host device). Or, the memory system may be realized as a removable storage device such as an USE memory, or may be realized as an embedded storage device.

The memory controller communication line 4 is a signal line used for the communication between the controller 2 and the nonvolatile memory 1. In the memory controller communication line 4, plural signals are defined. The signals may conform to an ONFi specification. The signals include a chip enable signal CEn, write enable signal WEn, read enable signal REn, command latch enable signal CLE, address latch enable signal ALE, write protect signal WPn, I/O signal <7:0>, and ready/busy signal RBn. The word n added to the end of signal terms means that the signal is a low active signal.

The nonvolatile memory 1 is realized as a semiconductor memory chip such as a NAND flash memory chip. The nonvolatile memory 1 includes signal pins corresponding to the chip enable signal CEn, write enable signal WEn, read enable signal REn, command latch enable signal CLE, address latch enable signal ALE, write protect signal WPn, I/O signal <7:0>, and ready/busy signal RBn, respectively. The nonvolatile memory 1 is connectable to the controller 2 via these signal pins and the memory controller communication line 4.

The chip enable signal CEn is a signal to select the nonvolatile memory 1 (for example, NAND flash memory chip).

The write enable signal WEn controls the acquisition (latch) of a command, address, input data intake (latch) on a data bus (I/O signal <7:0>). The read enable signal REn enables serial data output to the data bus (I/O signal <7:0>).

The command latch enable signal CLE is used to notify to the nonvolatile memory 1 that a current bus cycle type on the data bus (I/O signal <7:0>) is a command.

The address latch enable signal ALE is used to notify to the nonvolatile memory 1 that a current bus cycle type on the data bus (I/O signal <7:0>) is an address.

The write protect signal WPn is used to disable a program operation and an erase operation. The ready/busy signal RBn indicates a current state (ready state or busy state) of the nonvolatile memory 1.

Figure 2:
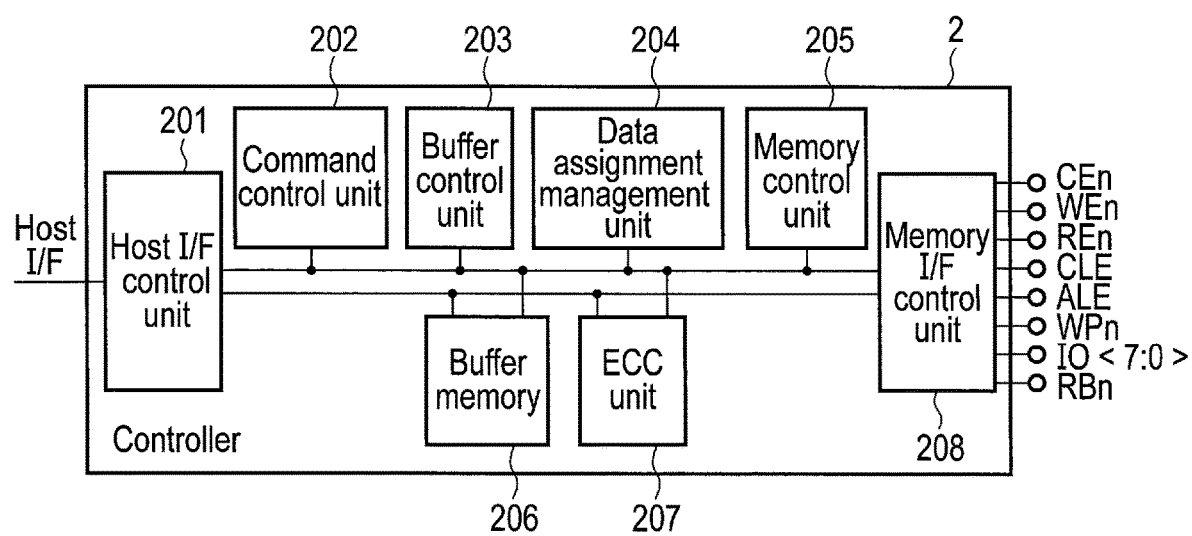
FIG. 2 is a block diagram illustrating an example of a structure of the controller in the memory system of FIG. 1.

FIG. 2 is a block diagram illustrating the internal components of the controller 2 of FIG. 1 in detail.

The controller 2 controls writing of data to the nonvolatile memory 1 in accordance with a data write request (write command) received from the host system (host device) such as a CPU in an information processing apparatus, and controls reading of data from the nonvolatile memory 1 in accordance with a data read request (read command) received from the host system (host device).

The controller 2 includes a host interface control unit 201, command control unit 202, buffer control unit 203, data assign management unit 204, memory control unit 205, buffer memory 206, error correction code (ECC) processing unit 207, and memory interface control unit 208.

The host interface control unit 201 communicates with the host system (host device) via the host interface 3. The host interface control unit 201 executes, in accordance with an instruction from the command control unit 202, an operation of receiving a request (command) and data from the host system (host device) and an operation of sending a processing result and data to the host system (host device).

As specific examples of the host interface 3, there are, for example, Nonvolatile Memory Express (NVMe) (registered trademark), Serial ATA (SATA), Serial Attached SCSI (SAS), and Universal Flash Storage (UFS).

The command control unit 202 interprets a command received from the host system (host device) via the host interface control unit 201 and executes a process based on contents of the command by controlling other function blocks in the controller 2.

The buffer control unit 203 manages the buffer memory 206 and stores write data (user data) received from the host system (host device) and data read from the nonvolatile memory 1 in a suitable location in the buffer memory 206.

The data assign management unit 204 manages to determine to which page in which block in the nonvolatile memory 1 the user data received from the host system (host device) are assigned. Here, a block is a unit of erase operation, and a page is a unit of program operation and read operation.

The controller 2 receives user data associated with a data write request (write command) received from the host system (host device) from the host system (host device). An address corresponding to the user data (for example, logical address), and the user data are designated by the write command. Specifically, the write command designates a logical address (starting logical address), length, and data pointer. The starting logical address indicates a first logical address in the logical address range corresponding to the user data. The length indicates a length of the user data. The data pointer indicates a location of the user data in a host memory (memory in the host system (host device)).

The block and the page in the block to which the user data are to be assigned are determined by the data allocation control unit 204. That is, the data allocation control unit 204 determines a block address and page address to which the user data designated by the write command received from the host system (host device) are to be assigned, and assigns the determined block address and page address to the logical address designated by the received write command.

Furthermore, the controller 2 generates write data to be actually written in the nonvolatile memory 1 (for example, encoded data such as ECC encoded data) based on the user data received from the host system (host device). A physical address indicative of a physical storage location in the nonvolatile memory 1 to which the write data are written is determined based on a combination of the block address and the page address assigned to the logical address of the user data corresponding to the write data.

Furthermore, in the controller 2, mapping data indicative of a corresponding relationship between each logical address designated by the host system (host device) for access to the memory system and each physical address of the nonvolatile memory 1 is managed by using a logical-to-physical address translation table. Each physical address is represented by a combination of the block address and the page address, or a combination of the block address, page address, and page offset. The controller 2 updates the logical-to-physical address translation table to associate the physical address (block address and page address) with the address (logical address) designated by the write command received from the host system (host device).

When the controller 2 receives a read request (read command) from the host system (host device), the controller 2 refers to the logical-to-physical address translation table to retrieve a physical address corresponding to the logical address designated by the read command from the logical-to-physical address translation table.

The memory control unit 205 controls the memory interface control unit 208 in accordance with an instruction from the command control unit 202. Specifically, the memory control unit 205 controls the memory interface control unit 208 to read data from the nonvolatile memory 1 and to write data to the nonvolatile memory 1. An operation to write data to the nonvolatile memory 1 may be referred to as a program operation.

The buffer memory 206 is a region to temporarily store data exchanged between the host system (host device) and the nonvolatile memory 1. The buffer memory 206 includes, in general, a volatile memory such as DRAM and SRAM.

The error correction code (ECC) processing unit 207 performs, based on an instruction from the command control unit 202, an error correction encoding process to add an error correction code to the user data transferred from the buffer memory 206 to the nonvolatile memory 1 via the memory interface control unit 208. The error correction encoding process is an encoding process of encoding the user data to generate encoded data including the user data and error correction code (ECC) which can correct an error of the user data. Furthermore, the error correction code (ECC) processing unit 207 performs, based on an instruction from the command control unit 202, an error correction decoding process to correct an error in read data transferred from the nonvolatile memory 1 via the memory interface control unit 208. The error correction decoding process is a decoding process of decoding encoded data including the data and the ECC to correct the error included in the data.

The memory interface control unit 208 performs, based on an instruction from the memory control unit 205, electrical operation of physical signal lines between the nonvolatile memory 1 and the controller 2 to achieve a desired operation of the nonvolatile memory 1.

Figure 3A:
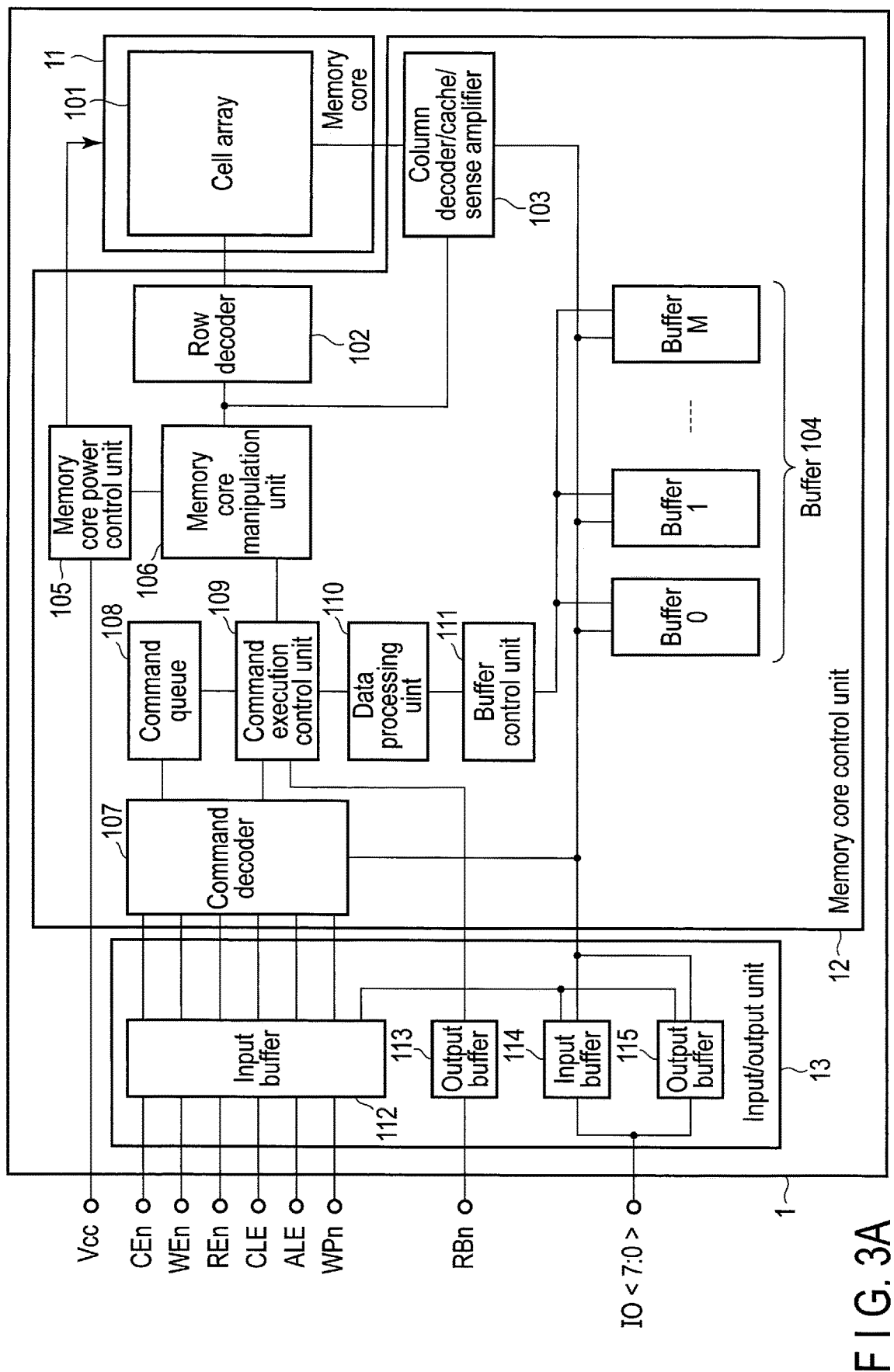
FIG. 3A is a block diagram illustrating an example of a structure of the nonvolatile memory.

FIG. 3A is a block diagram illustrating the internal components of the nonvolatile memory 1 of FIG. 1.

The nonvolatile memory 1 includes a memory core 11, memory core control unit 12, and input/output unit 13.

The memory core 11 includes a cell array 101. The cell array 101 includes a large number of nonvolatile memory elements (memory cells) arranged regularly.

The input/output unit 13 includes input buffers 112 and 114 and output buffers 113 and 115.

The input buffers 112 and 114 temporarily store each signal received from the controller 2 via each signal line to carry a signal from the controller 2 to the nonvolatile memory 1. The output buffers 113 and 115 temporarily store a signal to be sent to the controller 2 via each signal line to carry a signal from the nonvolatile memory 1 to the controller 2.

The memory core control unit 12 functions as a control circuit configured to control writing of data to the cell array 101 and reading of data from the cell array 101.

The memory core control unit 12 includes row decoder 102, column decoder/cache/sense amplifier 103, buffer 104, memory core power control unit 105, memory core manipulation unit 106, command decoder 107, command queue 108, command execution control unit 109, data processing unit 110, and buffer control unit 111.

The row decoder 102 designates a row which is a manipulation target in the cell array 101. The column decoder/cache/sense amplifier 103 performs, for example, transfer of data to a set of memory cells belonging to a row designated/selected by the row decoder 102, read (sense) of data from a set of memory cells belonging to a row designated/selected by the row decoder, and select of column in the cache.

The buffer 104 is a temporal storage space of the data to be written in the cell array 101 or the data read from the cell array 101. In this example, M+1 buffers are provided as the buffer 104.

The memory core power control unit 105 generates, based on an instruction by the memory core manipulation unit 106, a voltage/current required for the memory core 11 from a power supply voltage Vcc externally supplied.

The memory core manipulation unit 106 generates, based on an instruction by the command execution control unit 109, a voltage/current required for the operation of the cell array 101 by controlling the memory core power control unit 105, and controls the program operation to write data to the cell array 101 and the read operation to read data from the cell array 101.

In the program operation, the memory core manipulation unit 106 causes the row decoder 102 to select a row of manipulation target and instructs the cache sense amplifier 103 to write (program) data to the cell array 101. In the read operation, the memory core manipulation unit 106 causes the row decoder 102 to select a row of manipulation target and instructs the cache sense amplifier 103 to read data from the cell array 101.

The command decoder 107 interprets contents of a command received from the controller 2 via the input buffer 114, stores the command in the command queue 108, and notifies reception of the command to the command execution control unit 109.

The command queue 108 is a region to temporarily store the commands received by the command decoder 107. The commands stored in the command queue 108 are acquired and executed by the command execution control unit 109. When the command execution is completed, the commands are deleted from the command queue 108.

Upon receipt of a command reception notification from the command decoder 107, the command execution control unit 109 acquires this command from the command queue 108 and executes this command by controlling the memory core manipulation unit 106, data processing unit 110, and output buffer 113.

The data processing unit 110 performs, based on an instruction from the command execution control unit 109, manipulation of data in the buffer 104. The data processing unit 110 instructs the buffer control unit 111 to manipulate the data in the buffer 104.

The buffer control unit 111 performs manipulation and management of data in the buffer 104 based on an instruction by the data processing unit 110. The management of validation/invalidation of each buffer used as the buffer 104 is performed by the buffer control unit 111.

Figure 3B:
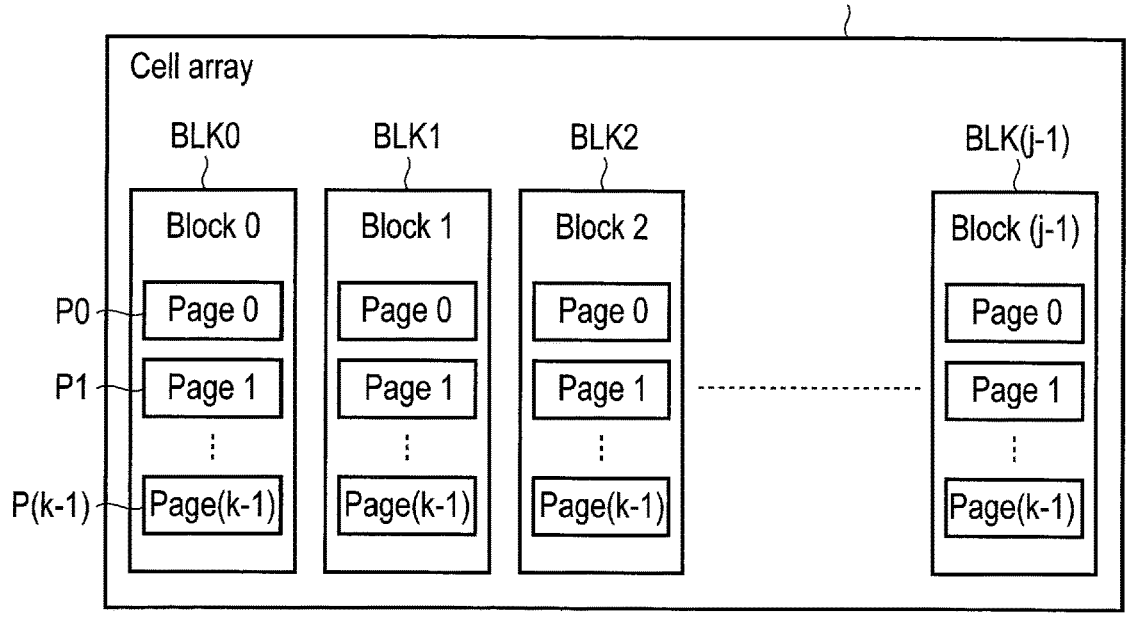
FIG. 3B is a block diagram illustrating an example of a structure of a cell array included in the nonvolatile memory.

FIG. 3B illustrates an example of a structure of the cell array 101.

The cell array 101 includes a plurality of memory cells arranged in a matrix. The cell array 101 includes a plurality of blocks (physical blocks) BLK0 to BLK(j−1) as shown in FIG. 3B. The blocks BLK0 to BLK(j−1) function as units of erase operation.

The blocks BLK0 to BLK(j−1) include a plurality of pages. That is, each of blocks BLK0 to BLK(j−1) includes page P0, P1, . . . , P(k−1). Data read and data write are executed in a unit of a page.

The nonvolatile memory 1 may be a single level cell (SLC)-flash memory which stores 1-bit data in one memory cell, or multi-level cell (MLC)-flash memory which stored 2-bit data in one memory cell, or triple level cell (TLC)-flash memory which stores 3-bit data in one memory cell, or quad-level cell (QLC)-flash memory which stores 4-bit data in one memory cell.

In the SLC, a set of memory cells connected to the same word line in the block functions as one page.

In the MLC, a set of memory cells connected to the same word line functions as two pages (referred to as lower page and upper page).

Furthermore, in the TLC, a set of memory cells connected to the same word line functions as three pages (referred to as lower page, middle page, and upper page).

Figure 3C:
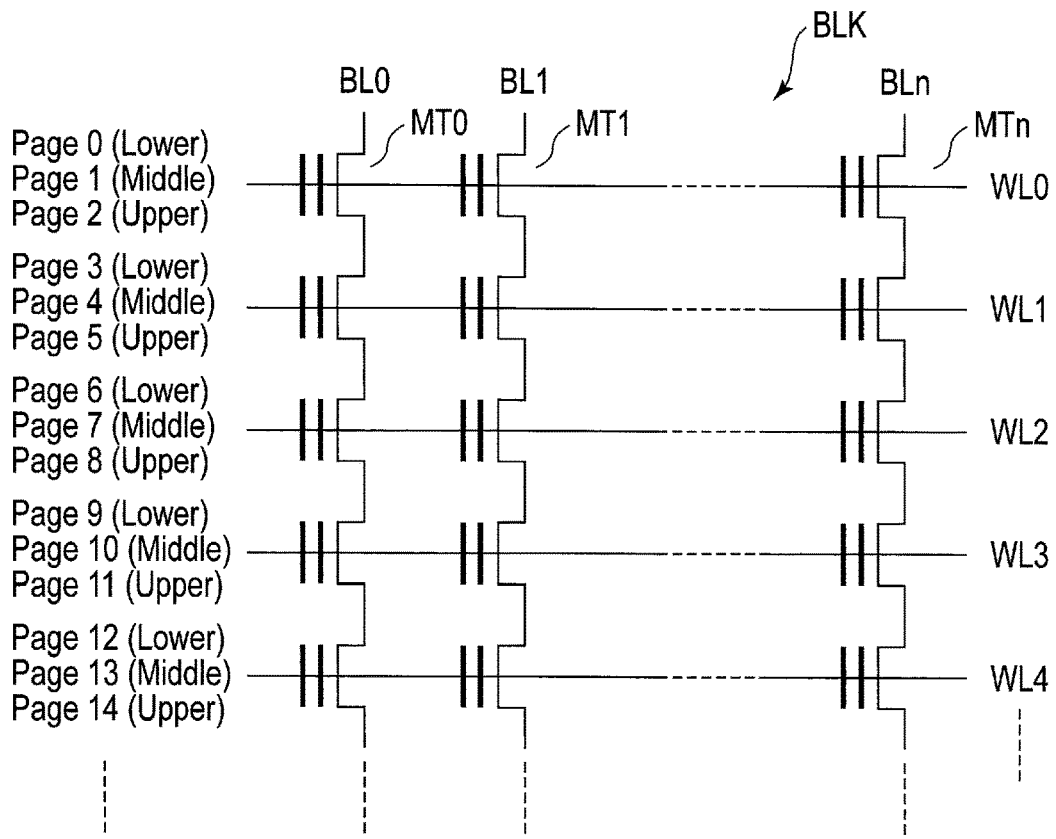
FIG. 3C is a circuit diagram illustrating an example of a structure of each block included in the cell array.

FIG. 3C illustrates an example of the structure of each block included in the cell array 101.

One block BLK includes a plurality of word lines WL0, WL1, WL2, WL3, WL4, . . . . To each word line WL, a plurality of memory cells (memory cell transistors) MT0, MT1, . . . , MTn are connected.

For example, in the TCL storing 3-bit data per memory cell, each memory cell transistor is set to one of eight states of different threshold voltages. Each state corresponds to one of eight data values ("000", "001", "010", "011", "100", "101", "110", and "111").

Three pages (lower, middle, and upper pages) are assigned to each word line WL. 3-bit stored in each memory cell transistor belong to three different pages (lower, middle, and upper pages), respectively.

For example, to a set of memory cell transistors connected to the word line WL0, page 0 (lower page), page 1 (middle page), and page 2 (upper page) are assigned. Similarly, to a set of memory cell transistors connected to the word line WL1, page 3 (lower page), page 4 (middle page), and page 5 (upper page) are assigned, and to a set of memory cell transistors connected to the word line WL2, page 6 (lower page), page 7 (middle page), and page 8 (upper page) are assigned.

FIG. 4 illustrates an example of a program order table which defines a program order rule applied to the nonvolatile memory 1.

The program order indicated by the program order rule indicates an order of pages required to write data to each block. In a case where several pages are assigned to each word line, the program order may indicate an order of word lines required to write data to each block.

Hereinafter, an example of the program order will be explained referring to an example of a flash memory (TLC).

The program order table of FIG. 4 indicates a corresponding relationship between program order numbers (program order number 0, program order number 1, program order number 2, . . . ) which indicate an order of program of word lines WL belonging to the same block and page addresses indicative of pages corresponding to the program order numbers 0, 1, 2, . . . .

For example, the first (program order number 0) program operation is a 1st program operation for the word like WL0 (program operation for page address 0). The page address 0 corresponds to the lower page of word line WL0.

The next (program order number 1) program operation is a 1st program operation for the word line WL1 (program operation for page address 3). The page address 3 corresponds to the lower page of word line WL1.

The next (program order number 2) program operation is a 2nd program operation for the word line WL0 (program operation for page address 1). The page address 1 corresponds to the middle page of word line WL0.

The next (program order number 3) program operation is a 1st program operation for the word line WL2 (program operation for page address 6). The page address 6 corresponds to the lower page of word line WL2.

The next (program order number 4) program operation is a 2nd program operation for the word line WL1 (program operation for page address 4). The page address 4 corresponds to the middle page of word line WL1.

The next (program order number 5) program operation is a 3rd program operation for the word line WL0 (program operation for page address 2). The page address 2 corresponds to the upper page of word line WL0.

As above, in the nonvolatile memory 1, the program order to indicate an order of pages required to write data in each block is defined. In the example of FIG. 4, the program order is defined to alternately execute program operations for some adjacent word lines.

That is, the program operation for each word line WL is executed by individual three program operations including 1st, 2nd, and 3rd program operations. The 2nd program operation for the word line WL0 is started after the 1st program operation for the word line WL1 is completed. The 2nd program operation for the word line WL1 is started after the 1st program operation for the word line WL2 is completed.

The 3rd program operation for the word line WL0 is started after the 2nd program operation for the word line WL1 is completed. The 3rd program operation for the word line WL1 is started after the 2nd program operation for the word line WL2 is completed.

The memory core control unit 12 of the nonvolatile memory 1 performs program operations for pages included in a write destination block selected from blocks by the controller 2 in the program order indicative of an order of pages required to write data in the destination block.

In the example of FIG. 4, in order to write data in the write destination block, the memory core control unit 12 is required to execute the program operation with respect the pages included in the write destination block by executing the program operation for page address 0, program operation for page address 3, program operation for page address 1, program operation for page address 6, program operation for page address 4, and program operation for page address 2 in this order.

FIG. 5 illustrates a buffer management table maintained and managed by the buffer control unit 111.

The buffer management table is a table to manage the buffer 104 in the nonvolatile memory 1 and includes plural columns corresponding to plural buffers used as the buffer 104. Each column includes a buffer number 51, valid/invalid flag 52, block address 53, page address 54, and data required period 55.

In each column of the buffer management table, the buffer number 51 indicates a buffer number to identify a buffer corresponding to the column. The valid/invalid flag 52 indicates whether the content of the buffer corresponding to the column is valid or invalid. The block address 53 indicates a block address to identify the block to which the contents of the buffer corresponding to the column belong. The page address 54 indicates a page address to identify the page corresponding to the contents of the buffer corresponding to the column. The data required period 55 indicates a period of time required to maintain data in the buffer in order to execute the program operation using the data stored in the buffer corresponding to the column.

Specifically, as a value of the data required period 55 corresponding to certain data, a program order number corresponding to the 3rd program operation related to the word line programmed using the data is used.

For example, with respect to a buffer in which data to be written to the page address 0 are stored, a program order number (=5) corresponding to the 3rd program operation of the word line WL0 is the data required period corresponding to the data stored in the buffer.

Similarly, with respect to a buffer in which data to be written to the page address 1 or 2 are stored, a program order number (=5) corresponding to the 3rd program operation of the word line WL0 is the data required period corresponding to the data stored in the buffer.

Furthermore, with respect to a buffer in which data to be written to the page address 3 are stored, a program order number (=8) corresponding to the 3rd program operation of the word line WL1 is the data required period corresponding to the data stored in the buffer.

Similarly, with respect to a buffer in which data to be written to the page address 4 or 5 are stored, a program order number (=8) corresponding to the 3rd program operation of the word line WL1 is the data required period corresponding to the data stored in the buffer.

FIG. 6 illustrates a block write state management table maintained and managed by the data processing unit 110.

The write state management table of block is a table to manage the write state of blocks in the nonvolatile memory 1 and includes plural columns corresponding to plural blocks. Each column stores a block address 61, writing flag 62, next program order number 63, and completed program order number 64.

In each column in the block write state management table, the block address 61 indicates a block address to identify a block corresponding to the column. The writing flag 62 indicates whether or not the block corresponding to the column is being used as a write destination block (opened block). The next program order number 63 indicates a program order number corresponding to the next program operation to be executed with respect to the block corresponding to the column (hereinafter referred to as next program order number). The completed program order number 64 indicates the program order number of the program operation completed in the block corresponding to the column.

Specifically, as the value of the next program order number 63 and the value of the completed program order number 64, values of the program order 41 explained with reference to FIG. 4 are used.

If a certain block is selected as the write destination block, the next program order number corresponding to the block is the program order number 0. When the first (program order number 0) program operation (1st program operation of the word line WL0) is completed, the complete program order number corresponding to the block is the program order number 0, and the next program order number corresponding to the block is the program order number 1.

Now, the explanation of FIG. 4 is reviewed. The program order table of FIG. 4 indicates that, in order to store 3-bit data (eight states) in each memory cell of one word line, three program operations (1st, 2nd, and 3rd program operations) are required.

For example, in order to program each memory cell connected to the word line WL0 to a desired threshold voltage level corresponding to any one of the eight states, it is required that the 1st program operation for the word like WL0 is performed in the program order number 0, the 2nd program operation for the word line WL0 is performed in the program order number 2, and 3rd program operation for the word line WL0 is performed in the program order number 5.

Similarly, in order to program each memory cell connected to the word line WL1 to a desired threshold voltage level corresponding to any one of the eight states, it is required that the 1st program operation for the word like WL1 is performed in the program order number 1, the 2nd program operation for the word line WL1 is performed in the program order number 4, and 3rd program operation for the word line WL1 is performed in the program order number 8.

As can be understood from the above, the data write operation with respect to memory cells connected to each word line can be divided into three individual program operations (1st, 2nd, and 3rd program operations).

A 2nd program operation for a certain word line WLn is executed after a 1st program operation of adjacent word line WLn+1. Similarly, a 2nd program operation for the word line WLn+1 is executed after a 1st program operation of adjacent word line WLn+2. Then, a 3rd program operation for the word line WLn is executed after a 2nd program operation of adjacent word line WLn+1.

As can be understood from the above, the data write operation to the memory cell connected to each word line is performed by interleaving program operations for several adjacent word lines. This is because, in the nonvolatile memory 1 which is, for example, a NAND flash memory, data must be written in the memory cell of each word line while correcting a threshold voltage of the memory cell of each word line in accordance with states of adjacent word lines. By interleaving the program operations for several adjacent word lines, program disturbance caused by inter-cell interference can be reduced.

Note that the program order rule required for the data write operation to each block changes based on the generation and the data write method of the nonvolatile memory 1.

However, in the conventional communication between a NAND flash memory and a controller, the controller is required to determine a page to which data are written. That is, the conventional communication between the NAND flash memory and the controller is established based on a premise that a program order (that is, an order of pages required to write data in a block) applied to the NAND flash memory is grasped by the controller side.

Thus, in order to support various nonvolatile memories in which the program order to be used are different each other, it is required that a controller which can correspond to various write methods (that is, various program orders) is developed, or a new controller is developed at each time when a nonvolatile memory of new generation is produced.

However, in order to manufacture a controller which can support various write methods, various circuits corresponding to various write methods must be added to the controller, which requires costs. Furthermore, if a controller which can support various write methods is realized by software implementation, processing may be delayed by the software and the performance may be deteriorated.

Furthermore, repeating development of new-generation controller to keep up with nonvolatile memory 1 of new generation requires greater cost increase.

Thus, in the present embodiment, the nonvolatile memory 1 provides a technique to decrease a process load in the controller 2 side required to control the nonvolatile memory 1. Specifically, the present embodiment provides a technique to enable the controller 2 to support various write methods, and various generations of NAND flash memories.

Furthermore, in the data write operation, in order to perform the second and third program operation for each word line, data which is used in the preceding program operation for the same word line is required.

For example, in the second program operation time of word line WL0 (2nd program operation), in order to determine a target threshold voltage (any one of four states) of each memory cell of the word line WL0, not only data to be written in the 2nd program operation (data corresponding to middle page) but also data used in the first program operation of word line WL0 (1st program operation) (data corresponding to lower page) are required.

Furthermore, in the third program operation time of word line WL0 (3rd program operation), in order to determine a final target threshold voltage (any one of eight states) of each memory cell, not only data to be written in the 3rd program operation (data corresponding to upper page) but also data used in the first program operation of word line WL0 (1st program operation) (data corresponding to lower page) and data used in the second program operation of word line WL0 (2nd program operation) (data corresponding to middle page) are required.

At that time, in the conventional memory-controller interface specification, for example, in the second program operation time, not only the data required in the second program operation but also data used in the first program operation must be transferred to the nonvolatile memory 1 from the controller 2. Similarly, for example, in the third program operation time, not only the data required in the third program operation but also data used in the first and second program operations must be transferred to the nonvolatile memory 1 from the controller 2. Thus, the number of communication processes between the controller 2 and the nonvolatile memory 1 increase.

When the number of communication processes increases, both (i) a time used in the communication in a communication path within the controller 2 and (ii) a time used in the communication in a communication path between the controller 2 and the nonvolatile memory 1 increase, this time cannot be used for other processes, and further the power used in the communication increases.

Thus, in the present embodiment, a technique to suppress increase of the number of communication processes between the memory and the controller is provided.

Hereinafter, specific communication contents between the nonvolatile memory 1 and the controller 2 will be explained.

Figure 7A:
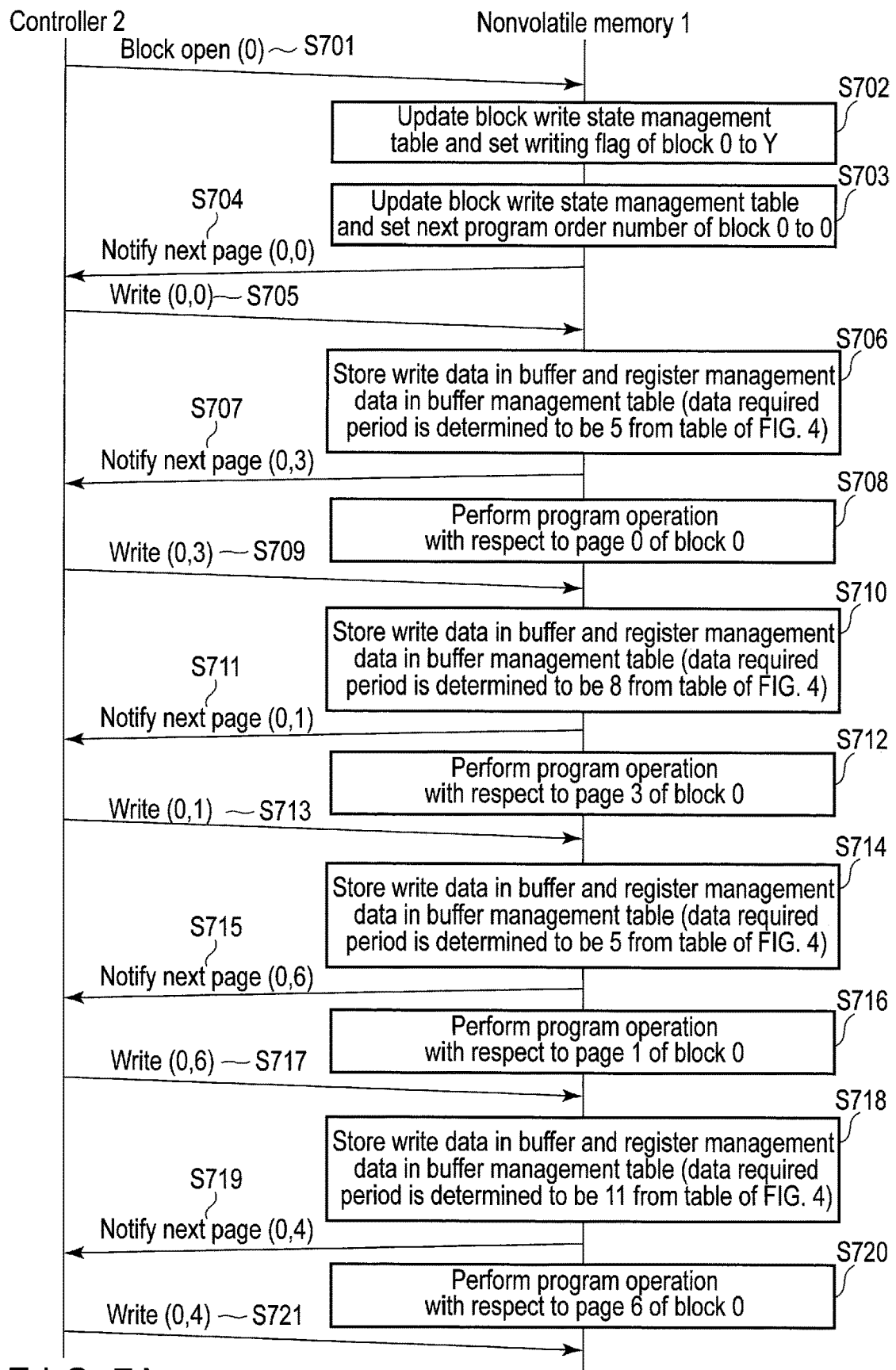
FIG. 7A is a sequence diagram illustrating a part of a procedure of a data write process executed by the controller and the nonvolatile memory.
Figure 7B:
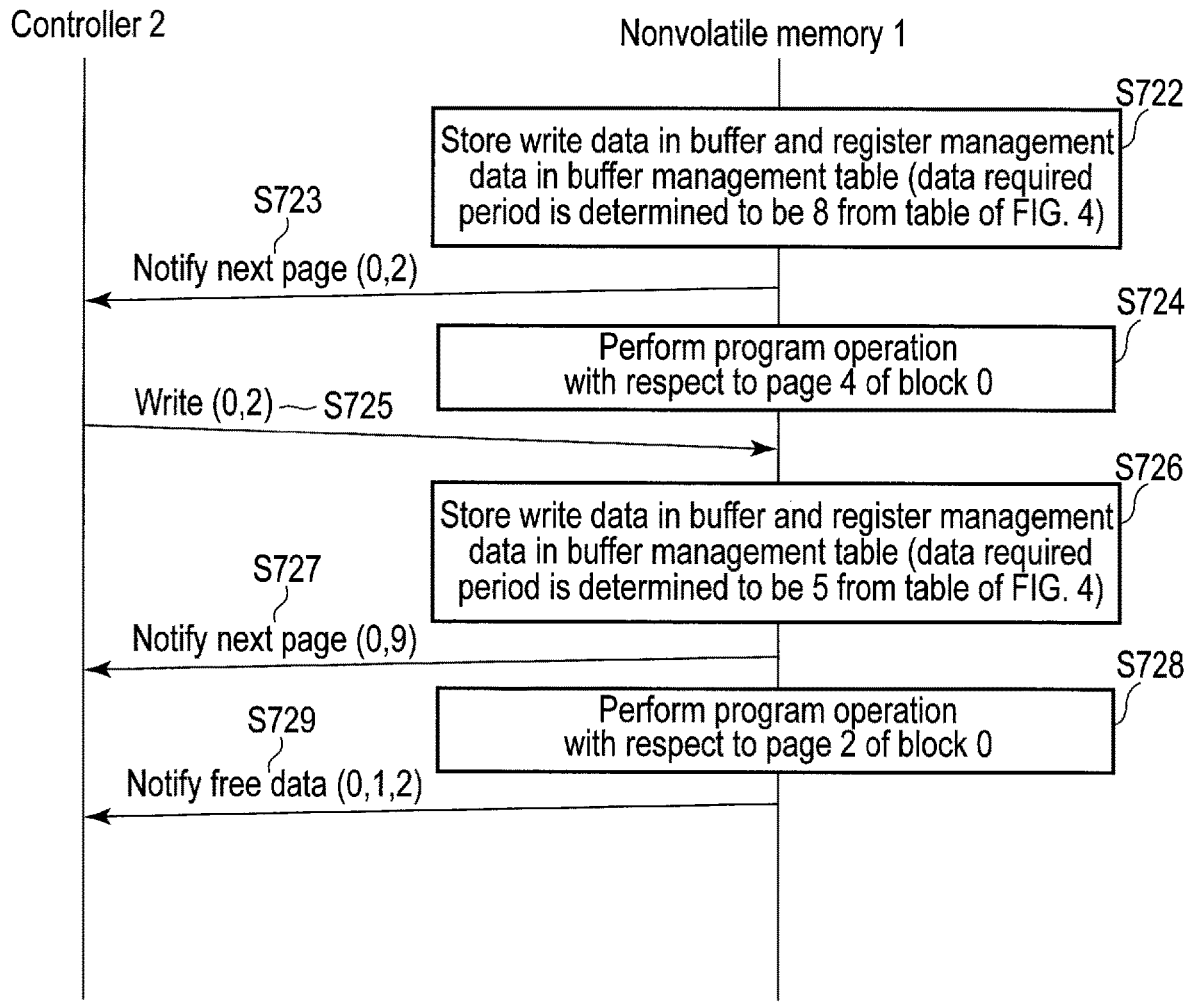
FIG. 7B is a sequence diagram illustrating the following procedure of the data write process executed by the controller and the nonvolatile memory.

FIGS. 7A and 7B illustrate a data write process executed by the controller 2 and the nonvolatile memory 1.

A procedure of the data write process of the first embodiment will be explained with reference to FIGS. 7A and 7B.

As in FIG. 7A, initially, the controller 2 designates a block address with respect to the nonvolatile memory 1 and notifies that a write process to the block is started to the nonvolatile memory 1 (step S701).

In step S701, the controller 2 may send a request to select one of blocks (free blocks) in the nonvolatile memory 1 as a write destination block (Block open request) to the nonvolatile memory 1. For example, if the selected write destination block is a block having block address 0, the controller 2 sends Block open (0) to the nonvolatile memory 1. Here, (0) of Block open (0) represents block address 0.

In other words, in step S701, the controller 2 sends a block address indicative of one block selected from blocks (free blocks) in the nonvolatile memory 1 to the nonvolatile memory 1. Here, the block address may be also referred as first address signal.

When the memory core control unit 12 of the nonvolatile memory 1 receives a request to select the write destination block (Block open (0)), that is, a block address from the controller 2, the memory core control unit 12 updates the block write state management table of FIG. 6 and sets a writing flag corresponding to the designated block 0 (block having block address 0) to Y (=Yes) (step S702).

Furthermore, the memory core control unit 12 updates the block write state management table of FIG. 6 and initializes the value of the next program order number 63 corresponding to the designated block 0 (block having block address 0) to 0 (step S703).

Then, the memory core control unit 12 of the nonvolatile memory 1 notifies to the controller 2 that data required to perform the next program operation with respect to block 0 is data of page 0 (step S704). In other words, in step S704, in response to receiving the block address from the controller 2, the memory core control unit 12 sends a page address which is selected on the basis of the received block address, to the controller 2. Here, the page address may be also referred to as second address signal.

That is, in step S704, the memory core control unit 12 notifies a page address corresponding to the next program operation with respect to the block 0 to the controller 2.

The next program order number corresponding to the next program operation is the value of the next program order number 63 (0 in this example), and referring to the table of FIG. 4, it is understood that the page address of the page required for the program operation of the next program order number 0 is 0. Thereinafter, similarly, the memory core control unit 12 acquires the next program order number from the write state management table of FIG. 6, and acquires a page address indicative of the page required for the program operation of the next program order number from the table of FIG. 4.

As above, in step S704, the memory core control unit 12 of the nonvolatile memory 1 notifies the page address indicative of the page required for the next program operation, that is, the page address of "next page" to the controller 2 (Notify next page (0, 0)). (0, 0) of Notify next page (0, 0) represents the block address 0 of the write destination block and the page address 0 of the next write destination page in the write destination block. Notify next page (0, 0) may be sent from the nonvolatile memory 1 to the controller 2 via the data bus to carry the I/O signal <7:0>.

As can be understood from the above, by notifying a pair of block address of the write destination block and page address of the write destination page in the write destination block to the controller 2 from the nonvolatile memory 1, even if several write destination blocks are opened at the same time, the memory core control unit 12 of the nonvolatile memory 1 can correctly notify the page address indicative of the page required for the next program operation to the controller 2 per write destination block.

Note that, it is not must that both the write destination block address and the page address are notified from the nonvolatile memory 1 to the controller 2. The notification of the write destination block address may be omitted, and only the page address may be notified from the nonvolatile memory 1 to the controller 2.

When the controller 2 receives page address 0 of the "next page" from the nonvolatile memory 1, the controller 2 transfers a program request designating the page address 0 (Write (0, 0)) and data to be written to the page having the page address 0 (which may be referred to as data of page 0) to the nonvolatile memory 1 (step S705). (0, 0) of Write (0, 0) represents that the write destination block address=0 and the page address=0. Note that the program request may not necessarily designate both the write destination block address and the page address, and the program request designating only the page address may be used.

Specifically, in step S705, initially, a program command, write destination block address, and page address are transferred from the controller 2 to the nonvolatile memory 1, and then, data of page 0 is transferred to the nonvolatile memory 1 from the controller 2.

When the memory core control unit 12 of the nonvolatile memory 1 receives the program request (Write (0, 0)) and the data of page 0 from the controller 2, the memory core control unit 12 stores the received data of page 0 in the buffer 104 and stores management data in the buffer management table of FIG. 5 (step S706).

For example, in a case where the data is stored in the buffer of buffer number 0, the memory core control unit 12 sets the valid/invalid flag 52 in the column related to the buffer number 0 of the buffer management table (FIG. 5) to a value indicative of valid, and sets the value of block address 51 in this column to 0, sets the value of page address 54 in this column to 0, and sets the value of data required period 55 in this column to 5. The value of data required period (here, 5) is determined referring to the table of FIG. 4.

That is, by referring to the table of FIG. 4, it is understood that the data of page 0 is data of word line WL0, and the third program operation of word line WL0 is program order number 5. Thus, the data of page 0 is required until the program operation of program order number 5 ends. From the above, the value of data required period 55 set with respect to the data of page 0 is derived as 5. Thereinafter, similarly, the data required period corresponding to the data of each page is acquired from the table of FIG. 4.

Now, the explanation of FIG. 7A will be resumed.

After acquiring the data of page 0 required for the next program operation in the write destination block 0, the memory core control unit 12 updates the value of next program order number 63 related to block 0 of the block write state management table (FIG. 6) to 1, and notifies to the controller 2 that the page address of data required for the next program operation in the write destination block 0 is 3 (step S707).

As above, in step S707, the memory core control unit 12 notifies page address 3 corresponding to the next program operation with respect to the write destination block 0 to the controller 2 (Notify next page (0, 3)). (0, 3) of Notify next page (0, 3) represents block address 0 of a write destination block and page address 3 of a write destination page in the write destination block. Then, the memory core control unit 12 performs a program operation to write data of page 0 received from the controller 2 to page 0 of block 0 (step S708). In other words, in step S708, in response to receiving from the controller 2 a command (program command) designating the write destination block address, page address, and data of page 0, the memory core control unit 12 programs the data of page 0 to a memory cell corresponding to an address (physical address) determined based on the write destination block address and the page address.

When the program of data with respect to the page 0 is completed, the memory core control unit 12 sets a value of the completed program order number 64 related to the block 0 of the block write state management table (FIG. 6) to 0.

When the controller 2 receives the page address 3 of the "next page" from the nonvolatile memory 1, the controller 2 transfers the program request (Write (0, 3)) designating the page address 3 and the data to be written to the page having the page address 3 (which may be referred to as data of page 3) to the nonvolatile memory 1 (step S709).

When the memory core control unit 12 of the nonvolatile memory 1 receives the program request (Write (0, 3)) and the data of page 3 from the controller 2, the memory core control unit 12 stores the data of page 3 in the buffer 104 and stores management data in the buffer management table of FIG. 5 (step S710). For example, in a case where the data of page 3 is stored in a buffer of buffer number 1, the memory core control unit 12 sets the valid/invalid flag 52 of a column related to buffer number 1 of the buffer management table (FIG. 5) to a value indicative of valid, sets a value of the block address 51 of this column to 0, sets a value of the page address 54 of this column to 3, and sets a value of the data required period 55 of this column to 8. The value of data required period (8 in this example) is determined by referring to the table of FIG. 4.

After acquiring data of page 3 required for the next program operation of the write destination block 0, the memory core control unit 12 updates the value of the next program order number 63 related to the block 0 of the block write state management table (FIG. 6) to 2, and notifies, to the controller 2, that the page address of data required for the next program operation of the write destination block 0 is 1 (step S711).

As above, in step S711, the memory core control unit 12 notifies page address 1 corresponding to the next program operation with respect to the write destination block 0 to the controller 2 (Notify next page (0, 1)). (0, 1) of Notify next page (0, 1) represents block address 0 of a write destination block and page address 1 of a write destination page in the write destination block. Then, the memory core control unit 12 performs a program operation to write data of page 3 received from the controller 2 to page 3 of block 0 (step S702).

When the controller 2 receives the page address 1 of the "next page" from the nonvolatile memory 1, the controller 2 transfers the program request (Write (0, 1)) designating the page address 1 and the data to be written to the page having the page address 1 (which may be referred to as data of page 1) to the nonvolatile memory 1 (step S713).

When the memory core control unit 12 of the nonvolatile memory 1 receives the program request (Write (0, 3)) and the data of page 1 from the controller 2, the memory core control unit 12 stores the data of page 1 in the buffer 104 and stores management data in the buffer management table of FIG. 5 (step S714). For example, in a case where the data of page 1 is stored in a buffer of buffer number 2, the memory core control unit 12 sets the valid/invalid flag 52 of a column related to buffer number 2 of the buffer management table (FIG. 5) to a value indicative of valid, sets a value of the block address 51 of this column to 0, sets a value of the page address 54 of this column to 1, and sets a value of the data required period 55 of this column to 5. The value of data required period (5 in this example) is determined by referring to the table of FIG. 4.

After acquiring data of page 1 required for the next program operation of the write destination block 0, the memory core control unit 12 updates the value of the next program order number 63 related to the block 0 of the block write state management table (FIG. 6) to 3, and notifies, to the controller 2, that the page address of data required for the next program operation of the write destination block 0 is 6 (step S715).

As above, in step S715, the memory core control unit 12 notifies page address 6 corresponding to the next program operation with respect to the write destination block 0 to the controller 2 (Notify next page (0, 6)). (0, 6) of Notify next page (0, 6) represents block address 0 of a write destination block and page address 6 of a write destination page in the write destination block. Then, the memory core control unit 12 reads the data of page 0 from the buffer 104, and performs a program operation for the page 1 of block 0 using the data of page 0 read from the buffer 104 and data of page 1 received from the controller 2 (step S716).

As can be understood from the above, if the program operation for the page designated by the program request received from the controller 2 is a second program operation of word line WL0, the memory core control unit 12 reads data (data of page 0) used in the first program operation for the word line WL0, and performs the program operation for page 1 using the read data of page 0 and data of page 1 transferred from the controller 2. Both the data of page 0 and the data of page 1 are used to determine a target threshold voltage level of each memory cell of the word line WL0. The target threshold voltage level is any one of four threshold voltage levels corresponding to the four data values corresponding to 2-bit.

Thereinafter, similar communication and processes are performed between the controller 2 and the nonvolatile memory 1 (from step S713 of FIG. 7A to step S728 of FIG. 7B).

In step S728 of FIG. 7B, the memory core control unit 12 reads both data of page 0 and data of page 1 from the buffer 104, and performs the program operation for page 2 of block 0 using the data of page 0 and data of page 1 read from the buffer 104 and the data of page 2 received from the controller 2. The data of page 0, data of page 1, and data of page 2 are used to determine a target threshold voltage level of each memory cell of the word line WL0. The target threshold voltage level is any one of eight threshold voltage levels corresponding to the eight data values corresponding to 3-bit.

Then, when the program of data with respect to page 2 is completed, the memory core control unit 12 sets the value of completed program order number 64 related to the block 0 of the block write state management table (FIG. 6) to 5.

Specifically, the contents of the block write state management table (FIG. 6) at this point are as in FIG. 9. Furthermore, the contents of the buffer management table (FIG. 6) at this point are as in FIG. 8.

Then, the memory core control unit 12 refers to the buffer management table of FIG. 5 to search for a buffer in which a value of the data required period 55 is 5. Then, the memory core control unit 12 detects that the values of the data required periods 55 corresponding to the buffers of buffer number 0, buffer number 2, and buffer number 5 are 5, and recognizes the values of page addresses 54 corresponding to the data stored in the above buffers (in this example, page addresses 0, 1, and 2) as the data of page which are no longer necessary for the program operation for any page in the write destination block 0. Then, in step S729, the memory core control unit 12 notifies a data unnecessary notification indicative of unnecessity of data corresponding to the page addresses 0, 1, and 2 to the controller 2 (Notify free data (0, 1, 2)). (0, 1, 2) of Notify free data (0, 1, 2) represents page addresses 0, 1, and 2.

Note that, not only the page addresses of unnecessary data but also the block address of a block to which the pages belong may be notified to the controller 2 from the nonvolatile memory 1.

Furthermore, in step S729, the memory core control unit 12 performs a process to release a buffer (region in the buffer 104) storing data corresponding to the page addresses 0, 1, and 2.

Upon receipt of the data unnecessary notification, the controller 2 determines that the designated data stored in the buffer memory 206 in the controller 2 are unnecessary. Then, the controller 2 releases the region in the buffer memory 206 storing the designated data and reuses the released region for storing other data and the like.

As can be understood from the above, the memory core control unit 12 of the nonvolatile memory 1 executes program operations for pages included in a write destination block in a particular program order.

The particular program order indicates an order of pages required to write data to the write destination block. Then, the memory core control unit 12 notifies a page address corresponding to a next program operation with respect to the write destination block to the controller 2.

Thus, the controller 2 simply performs a process to transfer data to be written to the page address designated by the nonvolatile memory 1 to the nonvolatile memory 1, and does not need to recognize in what program order each page is programmed by the nonvolatile memory 1. That is, even if a write method of the nonvolatile memory 1 as a control target is changed, the controller 2 can execute a proper data write operation by simply transferring data corresponding to a page address designated by the nonvolatile memory 1 to the nonvolatile memory 1.

Thus, even if the write method of the nonvolatile memory 1 is changed, development of a new controller which can control the nonvolatile memory 1 according to a proper program order corresponding to the changed write method is not required, and the controller 2 can be continuously used.

In general, generation of a NAND flash memory is updated in each year, for example. Thus, if new controllers are developed at each time when a new generation of NAND flash memory comes out, enormous cost increase is expected.

In the present embodiment, when a block address indicative of one block selected from a plurality of blocks is received from the controller 2, the nonvolatile memory 1 sends a page address selected based on the block address to the controller 2. Thus, a new communication interface specification in which the nonvolatile memory 1 notifies the page address corresponding to the next program operation with respect to the write destination block to the controller 2 can be provided. Thus, a process load of the controller 2 required to control the nonvolatile memory 1 can be reduced, and a memory system which can support NAND flash memories of different generations can be realized with a low cost.

Furthermore, in the present embodiment, as in step S704 of FIG. 7A, in response to receiving a process request (Block open request) to select one of the blocks as a write destination block from the controller 2, the memory core control unit 12 notifies, to the controller 2, a page address indicative of a page corresponding to a first program order number (program order number 0) among the pages included in the write destination block (for example, page address 0) as a page address indicative of a page required to execute the next program operation with respect to the write destination block.

Furthermore, in the present embodiment, as in step S707 of FIG. 7A, in response to receiving a program request designating a page address of a page corresponding to the first program order number (program order number 0) (for example, page address 0) and data to be written in the page address 0 from the controller 2, the memory core control unit 12 notifies, to the controller 2, a page address indicative of a page corresponding to a next program order number (program order number 1) among the pages included in the write destination block (for example, page address 3) as a page address indicative of a page required to execute the next program operation with respect to the write destination block.

As above, as a reply to the Block open request or the program request, a page address indicative of a page required for performing the next program operation is notified from the nonvolatile memory 1 to the controller 2.

Thus, at each time when the Block open request or the program request is issued, the controller 2 can easily recognize a page address indicative of a page required to perform the next program operation.

Furthermore, the controller 2 can recognize unnecessary data by receiving an unnecessary notification form the nonvolatile memory 1. Thus, the controller 2 can easily delete data unnecessary for a data write process of a write destination block from the buffer memory 206 without recognizing a number of pages assigned to each word line, program order, write method, or the like.

Furthermore, in the present embodiment, each of word lines belonging to a write destination block includes a plurality of pages, and the memory core control unit 12 executes program operations for a plurality of times with respect to each word line in the write destination block. The program order is determined such that program operations for adjacent word lines can be executed alternately.

As explained above with reference to FIG. 3A, the memory core control unit 12 includes the buffer 104 which sores data transferred from the controller 2. Then, in a case where the program operation for the page address designated by the program request received from the controller 2 is the second or following program operations for the word line WL0, for example, the memory core control unit 12 reads the data used in the preceding program operation for the word line WL0 from the buffer 104, and executes the program operation for the word line WL0 by using the read data and data to be written to the designated page address. The data to be written to the designated page address is transferred from the controller 2 to the nonvolatile memory 1.

Thus, the controller 2 only needs to send the data of the page designated by the nonvolatile memory 1 to the nonvolatile memory 1, and even if a write method in which a plurality of page data are required to write data to each word line is adopted by the nonvolatile memory 1, the controller 2 does not need to recognize the write method, and thus, the number of communication times and the length of communication time between the nonvolatile memory 1 and the controller 2 can be reduced.

Specifically, even if a write method in which the number of page data required for the data write changes depending on three kinds of write target page of lower, middle, and upper pages is adopted in the nonvolatile memory 1, the controller 2 does not need to recognize which one of lower, middle, and upper pages is the write target page, and simply performs a process to transfer a program request designating the page address notified by the nonvolatile memory 1 and write data of one page to be written to the page address to the nonvolatile memory 1.

The flowchart of FIG. 12 indicates a procedure of the process executed by the nonvolatile memory 1 when starting of the write process to a block is notified from the controller 2. The flowchart of FIG. 13 indicates a procedure of the process executed by the nonvolatile memory 1 when a program request and write data are received from the controller 2. The procedures will be detailed in the following second embodiment.

Second Embodiment

Now, the second embodiment will be explained.

In the second embodiment, a nonvolatile memory 1 and a controller 2 are structured similarly to those of the first embodiment.

In the first embodiment, the controller 2 transfers data corresponding to a page address designated by the nonvolatile memory 1 to the nonvolatile memory 1.

However, depending on a state of the controller 2, the controller 2 may not transfer the data corresponding to the page address designated by the nonvolatile memory 1 to the nonvolatile memory 1. The process in such a state is illustrated in FIG. 10.

Figure 10:
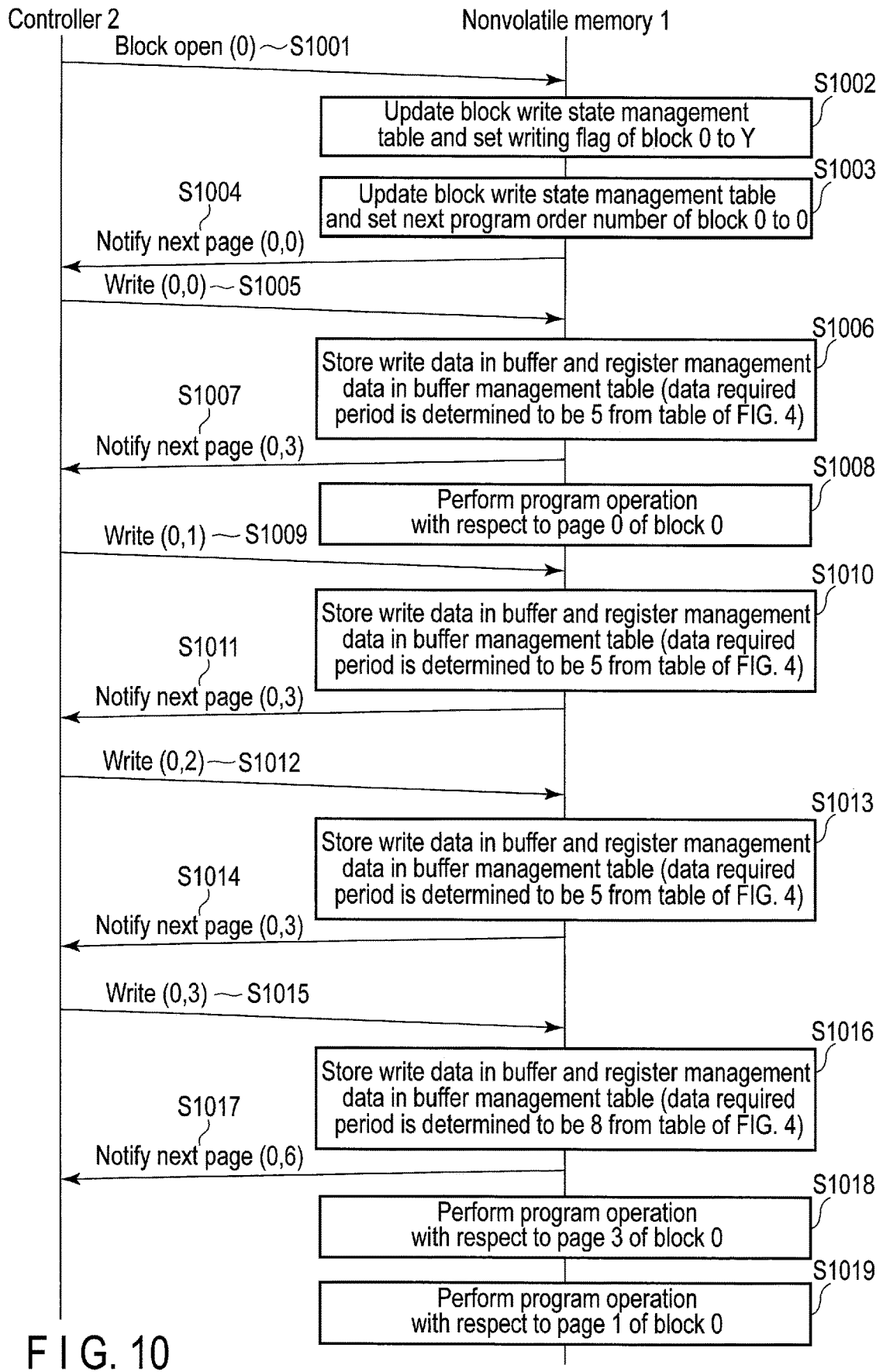
FIG. 10 is a sequence diagram illustrating another procedure of the data write process executed by the controller and the nonvolatile memory.

Steps S1001 to S1008 of FIG. 10 are the same as steps S701 to S708 of FIG. 7A, and thus, the explanation of steps S1001 to S1008 of FIG. 10 will be omitted.

Considered here is a case where the nonvolatile memory 1 notifies 3 as a page address of data required for the next program operation with respect to block 0 to the controller 2 but the controller 2 transfers a program request designating page address 1 of block 0 and data to be written in the page address 1 of block 0 (data of page 1) to the nonvolatile memory 1 (step S1009).

At that time, the memory core control unit 12 of the nonvolatile memory 1 stores data of page 1 received from the controller 2 in the buffer 104, and stores management data in the buffer management table of FIG. 5 (step S1010). A data required period of the data of page 1 is 5.

Then, the memory core control unit 12 again notifies to the controller 2 that the page address of the data required for the next program operation with respect to the block 0 is 3 (step S1011).

Then, the memory core control unit 12 does not perform the program operation for the page address 3 of the block 0 since there are not data required for the next program operation of the block 0 (data of page address 3).

Furthermore, When the controller 2 transfers the program request designating a page address 2 and data to be written to the page address 2 (data of page 2) to the nonvolatile memory 1, the memory core control unit 12 performs a similar process performed when the program request designating the page address 1 of the block 0 and data to be written to the page address 1 of the block 0 (data of page 1) are received (steps S1013 and S1014). A data required period of the data of page 2 is 5.

Then, When the controller 2 transfers the program request designating the page address 3 of the block 0 and data to be written to the page address 3 of the block 0 (data of page 3) to the nonvolatile memory 1 (step S1015), the memory core control unit 12 stores the data of page 3 received from the controller 2 in the buffer 104, and stores the management data in the buffer management table of FIG. 5 (step S1016). A data required period of the data of page 3 is 8.

The memory core control unit 12 notifies to the controller 2 that the data required for the next program operation with respect to the block 0 is data of page address 6 (step S1017).

Then, the memory core control unit 12 performs a program operation to write the data of page 3 finally received to the page 3 of the block 0 (step S1018). Then, the memory core control unit 12 updates the value of the next program order number 63 related to the block 0 of the block write state management table (FIG. 6) to 2, and the value of the completed program order number 64 related to the block 0 to 1.

At that time, the contents of the buffer management table of FIG. 5 become as in FIG. 11.

Then, the memory core control unit 12 recognizes that the next program order number is 2, the data required for the program of the page 1 corresponding to the program order number 2 are both the data corresponding to the page address 0 and the data corresponding to the page address 1, and the data corresponding to the page address 0 and the data corresponding to the page address 1 are both in the buffer 104.

Thus, the memory core control unit 12 reads, after the program of page 3 is completed, the data corresponding to the page address 0 and the data corresponding to the page address 1 from the buffer 104, and executes the program operation for the page 1 using both the read data corresponding to the page address 0 and the read data corresponding to the page address 1 (step S1019).

As can be understood from the above, in a case where data which are not the data of page required for the next program operation is transferred from the controller 2, the memory core control unit 12 of the nonvolatile memory 1 stores the data in the buffer 104, and if the next program order number becomes the program order number requiring the stored data, automatically executes the program operation for the page corresponding to the program order number without waiting for an instruction from the controller 1.

The contents of the process explained with reference to FIGS. 7A, 7B, and 10 are illustrated in flowcharts in FIGS. 12, 13, and 14.

Hereinafter, the contents of FIGS. 12, 13, and 14 will be explained.

FIG. 12 illustrates a procedure of the process executed by the nonvolatile memory 1 when the controller 2 notifies starting of a write process to a block to the nonvolatile memory 1 (steps S701 and S1001).

In a case where starting of the write process to a block having a block address is notified from the controller to the nonvolatile memory 1, the memory core control unit 12 of the nonvolatile memory 1 initializes a column related to the block in the block write state management table (FIG. 6) (step S1201).

The initialization means that a writing flag 62 is set to Y, and a value of next program order number 63, that is, the next program order number is set to 0.

Then, the memory core control unit 12 of the nonvolatile memory 1 returns page address 0 corresponding to the next program order number 0 (step S1202). The page address corresponding to the next program order number 0 can be acquired from the table of FIG. 4.

Now, FIG. 13 will be explained.

Figure 13:
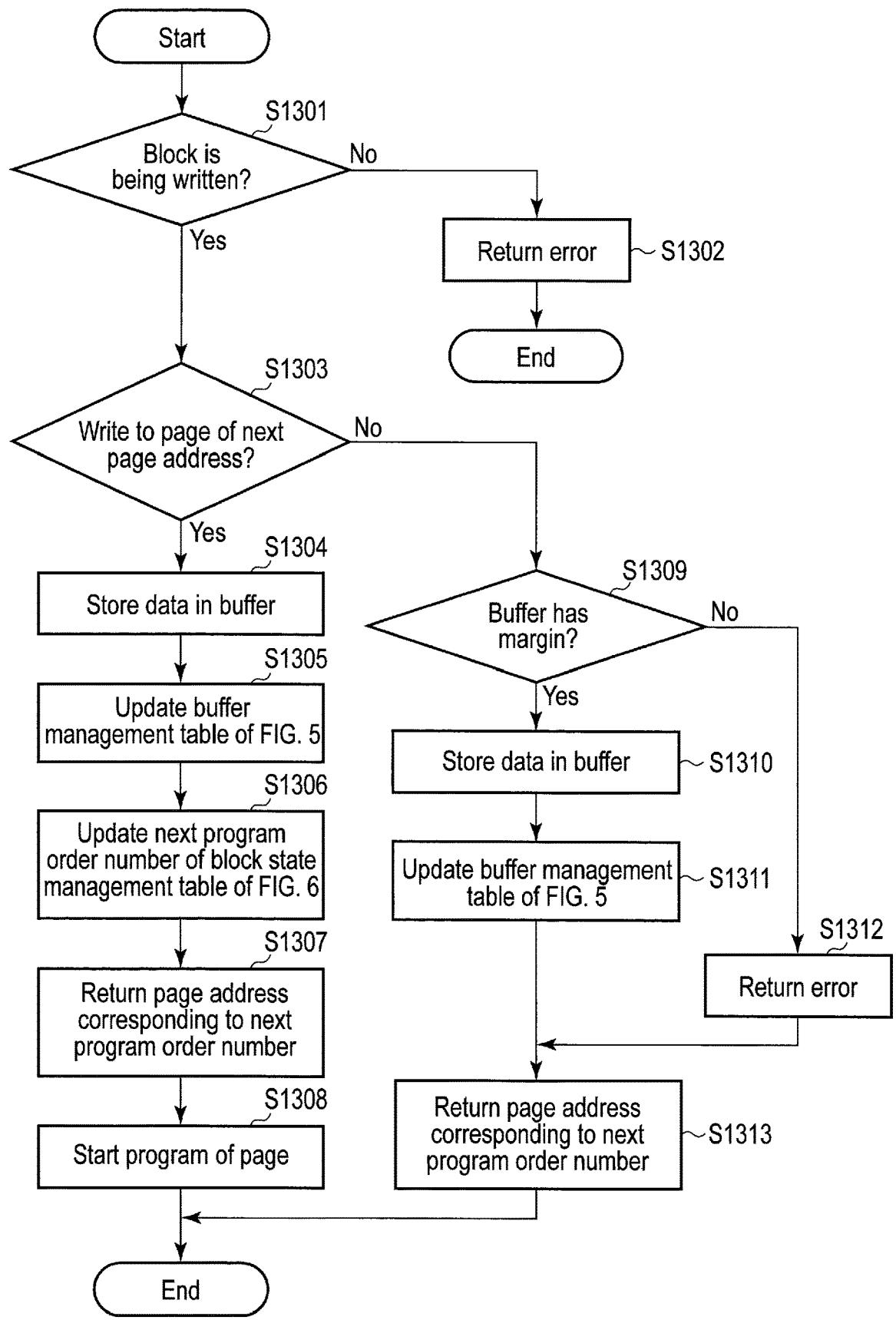
FIG. 13 is a flowchart illustrating a procedure of a process executed by the nonvolatile memory when the nonvolatile memory receives a program request and write data from the controller.

FIG. 13 illustrates a procedure of the process executed by the nonvolatile memory 1 when the program request and write data are transferred from the controller 2 to the nonvolatile memory 1.

Upon receipt of the program request from the controller 2, the memory core control unit 12 of the nonvolatile memory 1 determines whether or not the block designated by the received program request is a writing block (opened block) by referring to the block write state management table (FIG. 6) (step S1301).

If the block is not a writing block (No in step S1301), the memory core control unit 12 returns an error which indicates that the block has not yet received a start notification of write process to the controller 2 (step S1302) and ends the process.

If the block designated by the received program request is a writing block (Yes in step S1301), the memory core control unit 12 determines whether or not the page address designated by the received program request matches the page address corresponding to the value of the next program order number 63 of the block write state management table (FIG. 6) by referring to the table of FIG. 4 (step S1303).

If the page address designated by the received program request matches the page address corresponding to the value of the next program order number 63 (Yes in step S1303), the memory core control unit 12 stores the data received from the controller 2 in the buffer 104 (step S1304), and updates the buffer management table of FIG. 5 (step S1305).

In the process of updating the buffer management table of FIG. 5, with respect to the columns in the buffer management table corresponding to the buffer number storing the data, the memory core control unit 12 sets the valid/invalid flag 52 to a value indicative of valid, sets a value of block address 53 to the write target block address, sets a value of page address 54 to the write destination page address, and sets a value of data required period 55 to the program order number acquired by referring to the table of FIG. 4.

When the update of the buffer management table of FIG. 5 ends, the memory core control unit 12 updates the value of the next program order number 63 of the block write state management table of FIG. 6 (step S1306). For example, if the program request and data corresponding to the program order number 0 are transferred from the controller 2 to the nonvolatile memory 1, the value of the next program order number 63, that is, the next program order number is updated to 1.

Then, the memory core control unit 12 returns a page address corresponding to the updated value of the next program order number 63 related to the block to the controller 2 (step S1307). For example, in a case where the value of the next program order number 63 (program order number) is updated to 1, it is determined, from FIG. 4, that the page address corresponding to the updated program order number 1 is 3, and the page address 3 is returned to the controller 2.

Then, the memory core control unit 12 uses the data stored in the buffer 104 in step S1304 to start the program operation for the page designated by the program request which is already received from the controller 2 (step S1308).

If the page address of the data received from the controller 2 is not a page address corresponding to a value of the next program order number 63 (No in step S1303), the memory core control unit 12 checks whether or not a free region (margin) which can store data of the page required for the next program operation exists in the buffer 104 even when data other than the data of the page required for the next program operation is stored in the buffer 104 (step S1309).

In step S1309, the memory core control unit 12 may check, for example, whether or not a free region other than the free region for the data corresponding to the next program order number exists in the buffer 104. That is, the memory core control unit 12 may check if there are two or more free regions (two or more free buffers) are in the buffer 104, and may determine that the buffer 104 has a margin if there are two or more free regions (two or more free buffers).

In a case where there are not a free region (margin) which can store data other than the data of the page required for the next program operation in the buffer 104 (No in step S1309), the memory core control unit 12 returns an error which indicates that there are no free region (margin) in the buffer 104 to the controller 2 (step S1312).

On the other hand, in a case where there are a free region (margin) which can store data other than the data of the page required for the next program operation in the buffer 104 (Yes in step S1309), the memory core control unit 12 stores the data received from the controller 2 in the buffer 104 (step S1310) and updates the buffer management table of FIG. 5 (step S1311).

After steps S1311 and S1312, in either case, the memory core control unit 12 returns, to the controller 2, a page address corresponding to the value of the next program order number 63 of the block (step S1313) and then ends the process.

Figure 14:
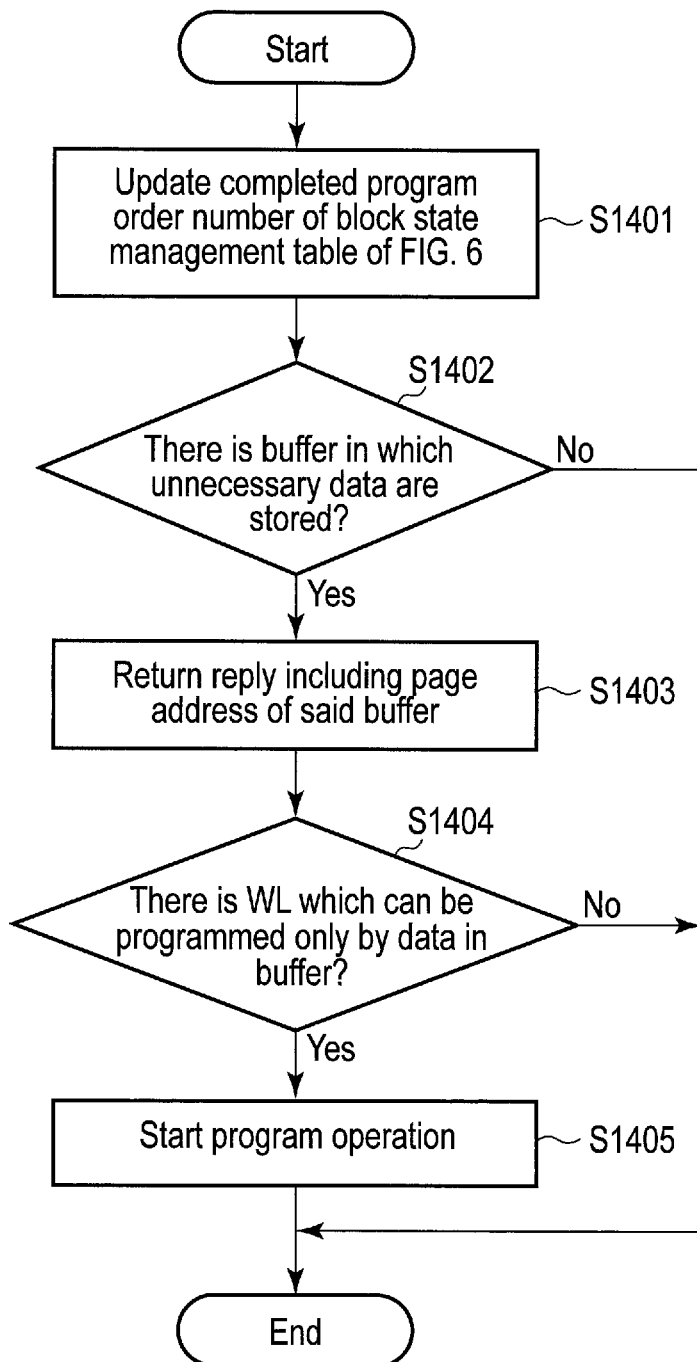
FIG. 14 is a flowchart illustrating a procedure of a process executed by the nonvolatile memory when a program operation for a certain page is completed.

FIG. 14 illustrates a procedure of the process executed by the memory core control unit 12 when the program operation starts in step S1308 of FIG. 13 is completed.

Upon detection of the completion of the program operation for a page of a write destination block, the memory core control unit 12 initially updates a value of the completed program order number 64 related to the block of the block write state management table (FIG. 6), that is, a completed program order number (step S1401).

Then, the memory core control unit 12 refers to the buffer management table of FIG. 5 to check whether or not there is a buffer to which the completed program order number is set in the data required period 55 (step S1402). The data stored in the buffers to which the completed program order number is set are data which are no longer necessary in the program operation for any page in the write destination block (unnecessary data).

If there is not a buffer to which the completed program order number is set in the data required period 55 (No in step S1402), the memory core control unit 12 ends the process.

If there are one or more buffers to which the completed program order number is set in the data required period 55 (Yes in step S1402), the memory core control unit 12 releases the buffers (regions in the buffer 104), and furthermore, returns a reply indicating that the data of page address corresponding to the buffers is unnecessary to the controller 2 (step S1403). This process corresponds to the process of step S729 of FIG. 7.

Then, the memory core control unit 12 checks whether or not all data required to execute a program operation for a page corresponding to a program order number next to the completed program order number, that is, next program operation are already in the buffer 104 by referring to the buffer management table of FIG. 5 (step S1404). All data required to execute the next program operation are: (1) if the next program operation corresponds to a second program operation of word line WL0 (2nd program operation), data of pages 0 and 1; and (2) if the next program operation corresponds to a third program operation of word line WL0 (3rd program operation), are data of pages 0, 1, and 2; and (3) if the next program operation corresponds to a first program operation of word line WL0 (1st program operation), are data of page 3.

Thus, for example, if the next program operation corresponds to the second program operation (2nd program operation), the memory core control unit 12 checks whether or not all data required to execute the next program operation are in the buffer 104, on the basis of whether or not both the data of pages 0 and 1 are in the buffer 104.

If there are not all data required for the next program operation (No in step S1404), the memory core control unit 12 ends the process.

On the other hand, if there are all data required for the next program operation in the buffer 104 (Yes in step S1404), the memory core control unit 12 uses the data in the buffer 104 to automatically start the next program operation (step S1405). Thus, the whole process is completed.

Note that, when the program operation started in step S1405 ends, the process returns to step S1401 to restart.

As can be understood from the above, in the second embodiment, upon receipt of a program request designating a page address which is different from the page address notified to the controller 2 and data corresponding to the different page address from the controller 2, the memory core control unit 12 does not execute the program operation for the page having the different page address and stores the received data in the buffer 104. Thus, even if the controller 2 sends the data of the page different from the page designated by the nonvolatile memory 1 to the nonvolatile memory 1, the data can be maintained in the buffer 104 in the nonvolatile memory 1 without discarding the data.

Furthermore, if the program request designating the notified page address and the data corresponding to the page having the notified page address are received from the controller 2, the memory core control unit 12 executes the program operation for the page having the notified page address. Then, after the program operation for the page having the notified page address is executed, if there are data corresponding to the next page to which the next program operation is to be executed are in the buffer 104, the memory core control unit 12 automatically executes the program operation for the next page.

Thus, even if the controller 2 sends the data corresponding to a page different from the page designated by the nonvolatile memory 1 to the nonvolatile memory 1, the data corresponding to the page different from the page designated by the nonvolatile memory 1 can be written to the write destination block in the proper program order without increasing the number of times of communication times between the controller 2 and the nonvolatile memory 1.

Third Embodiment

Now, as a third embodiment, explained is a structure where the nonvolatile memory 1 copies data from one block to another block based on an instruction from the controller 2.

In the third embodiment, a nonvolatile memory 1 and a controller 2 are structured similarly to those of the first and second embodiments.

Copy here indicates the following process.

Figure 15:
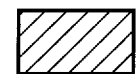
FIG. 15 is a diagram illustrating a data copy process executed within the nonvolatile memory.

For example, a case where there are blocks a and b of FIG. 15, and in the data stored in block a, four data stored in four storage locations a10, a13, a20, and a21, respectively, are valid data, and in the data stored in block b, four data stored in four storage locations b00, b01, b02, and b10, respectively, are valid data will be considered.

For example, a10 represents a block address a, page address 1, and offset 0. Similarly, b00 represents a block address b, page address 0, and offset 0.

Copying valid data of block a and valid data of block b in FIG. 15 to block c as another block will be referred to as a copy process. The copy process is executed in the nonvolatile memory 1. That is, the memory core control unit 12 reads data stored in the copy source location of the cell array 101 (valid data) from the cell array 101 to the buffer 104 and executes a program operation to write the read data (valid data) to a copy destination location (write destination page) of the cell array 101 from the buffer 104.

Such a process may be referred to as garbage collection.

Here, the valid data is data associated with any of logical addresses used by the host to access the memory system. The data associated with a logical address is data which may possibly be accessed later by the host. Invalid data is data which is not associated with any logical address.

In the controller 2, an address translation table to manage mapping between each of the logical addresses and each of the physical addresses indicative of storage locations of the nonvolatile memory 1 where data corresponding to the logical addresses are stored is managed. The updated data corresponding to a certain logical address is written to a storage location different from the storage location of the nonvolatile memory 1 where the previous data corresponding to the logical address is stored. The controller 2 updates the address translation table such that the physical address indicative of the storage location to which the updated data is written is associated with the logical address. Data stored in the latest physical address corresponding to each logical address is valid data.

Figure 16:
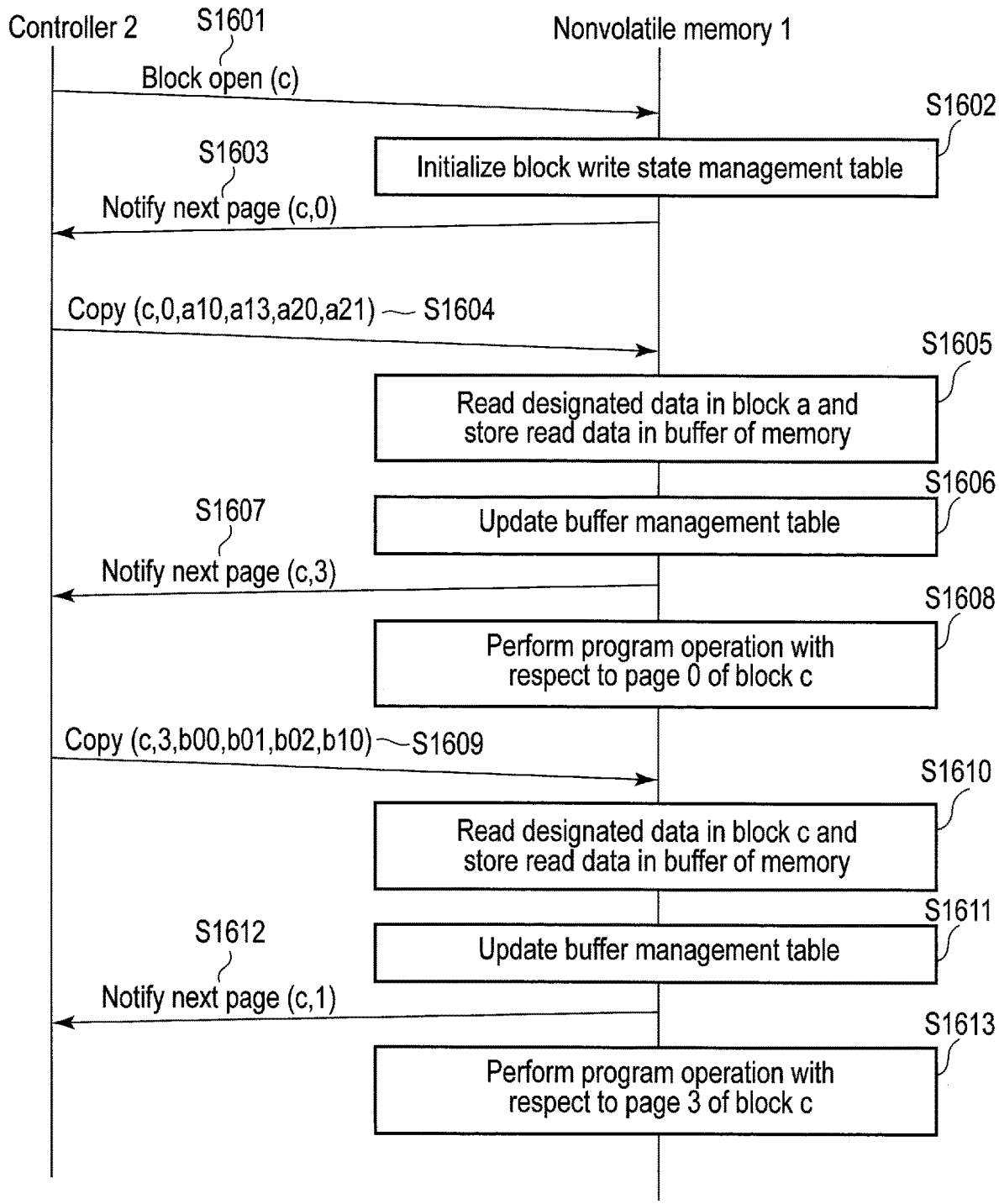
FIG. 16 is a sequence diagram illustrating a procedure of the data copy process executed by the controller and the nonvolatile memory.

The communication contents between the nonvolatile memory 1 and the controller 2 with respect to the copy process are as in FIG. 16.

The controller 2 initially notifies starting of write to a block to the memory 1 as in the ordinary write process (step S1601). In this example, starting of write to block c is notified. In step S1601, the controller 2 may send a request (Block open request) which selects one of the blocks (free blocks) in the nonvolatile memory 1 as a write destination block (here, may be referred to as a copy destination block) to the nonvolatile memory 1. If the selected write destination block is the block c having block address c, the controller 2 sends Block open (c) to the nonvolatile memory 1. Here, (c) of Block open (c) represents the block address c.

After receiving the notification of start of write to the block c, the memory core control unit 12 of the nonvolatile memory 1 initializes the column of block c of the block write state management table (FIG. 6) (step S1602), and notifies, to the controller 2, that the data required to execute the next program operation with respect to the block c is data of page 0 (step S1603).

In step S1603, the memory core control unit 12 notifies a page address 0 corresponding to the next program order number of block c to the controller 2 (Notify next page (c, 0)).

Then, the controller 2 sends a copy request designating a write destination block number (here, c), write destination page address (here, 0), and location information of copy target data (Copy (c, 0, a10, a13, a20, and a21)) to the nonvolatile memory 1 (step S1604).

In the example of FIG. 15, valid data are in four locations of block a, that is, a10, a13, a20, and a21, and thus, the controller 2 sends these locations to the nonvolatile memory 1 as the location information indicative of the copy source locations where the copy target data are stored.

In step S1604, specifically, the copy command, write destination block address, write destination page address, and location information of copy target data are transferred from the controller 2 to the nonvolatile memory 1.

Upon receipt of the copy request (Copy (c, 0, a10, a13, a20, and a21)), the memory core control unit 12 of the nonvolatile memory 1 reads data stored in the copy source locations designated by the copy request to the buffer 104 (step S1605), and updates the buffer management table (FIG. 5) (step S1606).

For example, if the data are stored in the buffer of buffer number 0, the memory core control unit 12 sets the valid/invalid flag 52 of the column related to the buffer number 0 of the buffer management table (FIG. 5) to a value indicative of valid, sets a value of the block address 51 in the column to c, sets a value of the page address 54 in the column to 0, and sets a value of the data required period 55 in the column to 5.

Then, the memory core control unit 12 notifies, to the controller 2, that the data required to execute the next program operation with respect to the block c is data of page 3 (step S1607).

In step S1607, the memory core control unit 12 notifies the page address 3 corresponding to the next program order number 1 of the block c to the controller 2 (Notify next page (c, 3)).

Then, the memory core control unit 12 starts the program operation for the page 0 of the block c using the data read in the buffer 104 (step S1608). Then, the memory core control unit 12 updates the contents of the block write state management table related to the block c (FIG. 6).

Then, the controller 2 sends a copy request designating the write destination block number (here, c), write destination page address (here, 3), and location information of copy target data (Copy (c, 3, b00, b01, b02, and b10)) to the nonvolatile memory 1 (step S1609).

In the example of FIG. 15, valid data are in four storage locations of block b, that is, b00, b01, b020, and b10, and thus, the controller 2 sends these storage locations to the nonvolatile memory 1 as the location information indicative of copy source locations where copy target data are stored.

Upon receipt of the copy request (Copy (c, 3, b00, b01, b02, and b10)), the memory core control unit 12 of the nonvolatile memory 1 reads data stored in the copy source locations designated to the buffer 104 (step S1610), and updates the buffer management table (FIG. 5) (step S1611).

For example, if the data are stored in the buffer of buffer number 1, the memory core control unit 12 sets the valid/invalid flag 52 of the column related to the buffer number 1 of the buffer management table (FIG. 5) to a value indicative of valid, sets a value of the block address 51 in the column to c, sets a value of the page address 54 in the column to 3, and sets a value of the data required period 55 in the column to 8.

Then, the memory core control unit 12 notifies, to the controller 2, that the data required to execute the next program operation with respect to the block c is data of page 1 (step S1612).

Then, the memory core control unit 12 starts the program operation for the page 3 of the block c using the data read in the buffer 104 (step S1613). Also, the memory core control unit 12 updates the contents of the block write state management table related to the block c (FIG. 6).

With the above structure, copying of data in the nonvolatile memory 1 can be performed without sending/receiving actual data between the nonvolatile memory 1 and the controller 2, and the time required for the process and the power used for the process can be reduced by the simplification of the communication contents.

Fourth Embodiment

Now, a fourth embodiment will be explained.

As compared to the nonvolatile memory 1 and the controller 2 of the first to third embodiments, a nonvolatile memory 1 and a controller 2 of the fourth embodiment are structured such that a memory core control unit 12 of the nonvolatile memory 1 includes, as in FIG. 17, an error correction code (ECC) processing unit 116 and an error mitigation code (EMC) processing unit 117. That is, in the fourth embodiment, the error correction code (ECC) processing unit 116 and the error mitigation code (EMC) processing unit 117 are provided with the memory core control unit 12 of the nonvolatile memory 1.

In FIG. 17, for simplification of the depiction, several elements of the memory core control unit 12 are depicted; however, the memory core control unit 12 of the fourth embodiment may include all components explained with reference to FIG. 3A, and the error correction code (ECC) processing unit 116 and the error mitigation code (EMC) processing unit 117.

The error correction code (ECC) processing unit 116 includes an ECC encoder 116a and an ECC decoder 116b. The ECC encoder 116a executes an error correction encoding process of encoding data (user data) to be written to a write destination block to add an error correction code to the data. The ECC decoder 116b executes an error correction decoding process of decoding the data read from the cell array 101 (encoded data including the user data and ECC) to correct an error included in the data.

As the error correction encoding process, Reed Solomon (RS) encoding, Bose Chaudhuri Hocquenghem (BCH) encoding, or the like can be used.

The error mitigation code (EMC) processing unit 117 includes an EMC encoder 117a and an EMC decoder 117b. The EMC encoder 117a performs an error mitigation encoding process of encoding original data to convert a data pattern (bit pattern) of the original data to an error-resistive data pattern, that is, a data pattern to mitigate an error. The EMC decoder 117b performs an error mitigation decoding process of decoding the data encoded by the error mitigation encoding process to return the data encoded by the error mitigation encoding process into the original data.

For example, the EMC encoder 117a performs encoding to generate a code word in which occurrence of 0 or 1 is biased. In this explanation, such encoding will be referred to as error mitigating encoding and a code used in the error mitigating encoding will be referred to as error mitigating code.

Here, occurrence of 0 means a number of times (frequency) of 0 appearing in bits of the code word. Occurrence of 1 means a number of times (frequency) of 1 appearing in bits of the code word. Thus, a code word in which the occurrence of 0 or 1 is biased is a code word in which the number (number of times of appearance) of 0s and the number (number of times of appearance) of 1s are different from each other.

In order to perform encoding to generate such a code word, there are a method to generate a code word of fixed bit length by encoding data of fixed bit length, method to generate a code word of a varied bit length by encoding data of fixed bit length, and method to generate a code word of fixed bit length by encoding data of varied bit length. In the following description, the method to generate a code word of fixed length by encoding data of fixed length will be referred to as a fixed length method. Furthermore, the method to generate a code word of varied bit length by encoding data of fixed bit length, method to generate a code word of fixed bit length by encoding data of varied bit length, and method to generate a code word of varied bit length by encoding data of varied bit length will be referred to as a varied length method.

The varied length method can make a difference between the occurrence of 0s and the occurrence of 1s greater as compared to the fixed length method. Thus, encoding by a varied length method may be used in the encoding performed by the EMC encoder 117a.

As varied length methods of encoding, there are entropy encodings such as Reverse Huffman encoding, Reverse Tunstall encoding, and Reverse Tunstall Huffman encoding, for example. The Reverse Huffman encoding is a reverse process of a Huffman encoding. The Reverse Tunstall Huffman encoding is a reverse process of Tunstall Huffman encoding. The Reverse Tunstall encoding is a reverse process of a Tunstall encoding. The Huffman encoding and Tunstall encoding are used in data compression. The Tunstall Huffman encoding is performing the Huffman encoding on a result of the Tunstall encoding.

Furthermore, other encodings used in the error mitigating encoding process will be, for example, an inter-cell interference (ICI) mitigating coding which encodes write target data such that a data pattern to be written in a memory cell can be a data pattern to mitigate inter-cell interference, endurance coding which encodes write target data such that a data pattern to be written to a memory cell can be a data pattern to reduce deterioration of the memory cell, and asymmetric coding which can change a ratio of 1 to 0 in data to be written in a memory cell (that is, code word).

For example, in the TLC, each memory cell is programmed to any one of eight states where threshold voltages are different, and an encoding process to reduce the number of memory cells to be programmed to a state corresponding to the highest threshold voltage where an error tends to occur may be used as the error mitigating encoding process.

In the data write process, the memory core control unit 12 can encode the data to be written in a write destination block by the error mitigating encoding process using the EMC encoder 117a, and can execute a program operation to write the data encoded by the error mitigating encoding process in a write destination page of the write destination block.

Furthermore, the memory core control unit 12 may further execute an error correction encoding process to add an ECC to the data encoded by the error mitigating encoding process, and may execute a program operation to write the data obtained by the error correction encoding process (encoded data obtained through the error mitigating encoding process and ECC) in the write destination page of the write destination block. In the data read process, the memory core control unit 12 initially executes the error correction decoding process to the data read from the cell array 101 using the ECC decoder 116b. Then, the memory core control unit 12 executes the error mitigation decoding process to return the data after error correction to the original data using the EMC decoder 117b.

Note that an error occurs in reading of the data stored in the cell array 101 because of a time lapse.

Thus, as particularly in the third embodiment, when copying data in the nonvolatile memory 1, it is effective that the error correction decoding process is performed with respect to the data read from the cell array 101 in the nonvolatile memory 1 using the ECC decoder 116b, and thus, the number of errors included in the read data is reduced and the data after the error correction are written in the write destination block (copy destination block).

Furthermore, tendency of errors in data written in the cell array 101 of the nonvolatile memory 1 will be predicted based on characteristics of the memory core 11 (characteristics of the cell array 101), and thus, it may be effective that the data are preliminarily manipulated to prevent such errors. The data manipulation to prevent errors is the role of the above EMC processing unit 117.

For example, in a copy process sequence of FIG. 16, when the controller 2 issues a process request to the nonvolatile memory 1 at step S1601, S1604, or S1609, the controller 2 instructs the nonvolatile memory 1 to adopt or not the error correction process using the ECC processing unit 116 and to adopt or not the error mitigating process using the EMC processing unit 117 in order to perform, in the nonvolatile memory 1, at least one of the error correction decoding process and the error mitigating decoding process in the data read at step S1605 or S1610 of FIG. 16 and to perform at least one of the error correction encoding process and the error mitigating encoding process in the programing at step S1608 or S1613 of FIG. 16.

Furthermore, in the data write process sequence of FIG. 7A, when the controller 2 issues a process request to the nonvolatile memory 1 at step S701, S705, or S709, the controller 2 instructs the nonvolatile memory 1 to adopt or not the error correction process using the ECC processing unit 116 and to adopt or not the error mitigating process using the EMC processing unit 117, in order to perform, in the nonvolatile memory 1, at least one of the error correction encoding process and the error mitigating encoding process in the programing at step S708 or S712 of FIG. 7A.

Specifically, in a case where validation of the ECC decoder 116b is instructed by the controller 2, the memory core control unit 12 performs, by using the ECC decoder 116b, the error correction decoding process with respect to the data which is read from the cell array 101 (encoded data including user data and ECC) based on a process request from the controller 2 (for example, a read request or a copy request).

Furthermore, in a case where validation of the ECC encoder 116a is instructed by the controller 2, the memory core control unit 12 performs, by using the ECC encoder 116a, the error correction encoding process to add an error correction code to the data to be written to the write destination block. Then, the memory core control unit 12 performs a program operation to write the data with the error correction code, that is, the encoded data including data and ECC to the write destination page of the write destination block.

Furthermore, in a case where validation of the EMC decoder 117b is instructed by the controller 2, the memory core control unit 12 performs, by using the EMC decoder 117b, the error mitigating decoding process with respect to the data which is read from the cell array 101 based on a process request from the controller 2 (for example, a read request or a copy request), and thereby returns the data encoded by the error mitigating encoding process to the original data.

Furthermore, in a case where validation of the EMC encoder 117a is instructed by the controller 2, the memory core control unit 12 performs, by using the EMC encoder 117a, the error mitigating encoding process to encode the data to be written to the write destination block. Then, the memory core control unit 12 performs a program operation to write the data obtained by the error mitigating encoding process to the write destination page of the write destination block.

Furthermore, in a case where validation of both the ECC decoder 116b and the EMC decoder 117b is instructed by the controller 2, the memory core control unit 12 performs, by using the ECC decoder 116b, the error correction decoding process with respect to the encoded data including data and ECC, which is read from the cell array 101 based on a process request from the controller 2 (for example, a read request or a copy request), and performs, by using the EMC decoder 117b, the error mitigating decoding process to return the data which is error corrected to the original data.

Furthermore, in a case where validation of both the ECC encoder 116a and the EMC encoder 117a is instructed by the controller 2, the memory core control unit 12 performs, by using the EMC encoder 117a, the error mitigating encoding process to encode the data to be written to the write destination block, and performs, by using the ECC encoder 116a, the error correction encoding process to add an error correction code to the data encoded by the error mitigating encoding process. Then, the memory core control unit 12 executes a program operation to write the data obtained by the error correction encoding process (encoded data obtained by the error mitigating encoding process and ECC) in the write destination page of the write destination block.

Note that, for example, in the data write process, in a case where encoded data generated by using the ECC processing unit 207 in the controller 2 (encoded data including user data and ECC) is sent as write data to the nonvolatile memory 1, the controller 2 may instruct the nonvolatile memory 1 to inactivate (disable) the ECC encoder 116a in the nonvolatile memory 1 such that the error correction encoding process in the nonvolatile memory 1 is not applied to the write data. Then, in a copy process or a read process, the controller 2 may instruct the nonvolatile memory 1 to activate the ECC encoder 116a in the nonvolatile memory 1 such that the error correction encoding process in the nonvolatile memory 1 is applied to the read data. In the copy process, the controller 2 may instruct the nonvolatile memory 1 such that both the ECC encoder 116a and the ECC decoder 116b in the nonvolatile memory 1 can be activated.

Figure 18:
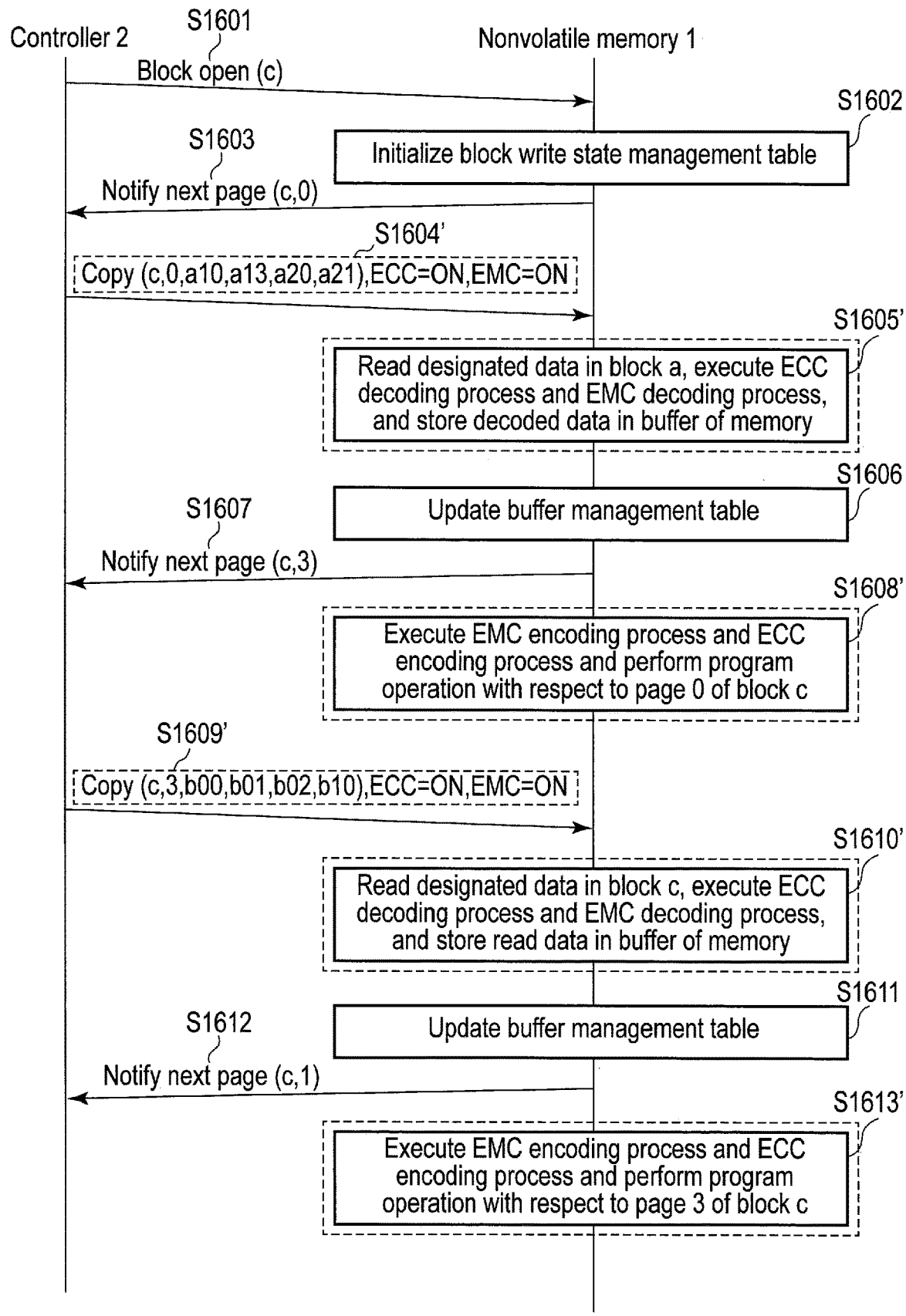
FIG. 18 is a sequence diagram illustrating another procedure of the data copy process executed by the controller and the nonvolatile memory.

FIG. 18 illustrates a sequence of a data copy process using the ECC processing unit 116 and the EMC processing unit 117.

In the data copy process of FIG. 18, as compared to the data copy process of FIG. 16, steps S1604', S1605', S1608', S1609', S1610', and S1613' are executed instead of S1604, S1605, S1608, S1609, S1610, S1613 of FIG. 16. Steps S1601 to S1603, S1606 to S1607, and S1611 to S1612 of FIG. 18 are the same as steps S1601 to S1603, S1606 to S1607, and S1611 to S1612 of FIG. 16, and thus, the description thereof will be omitted.

In the following explanation, considered is a case where both the ECC decoder 116b and the EMC decoder 117b are activated in the read and both the ECC encoder 116a and the EMC encoder 117a are activated in the write.

S1604': The controller 2 sends a copy request designating a write destination block number (here, c), write destination page address (here, 0), and location information of copy target data (Copy (c, 0, a10, a13, a20, and a21)) to the nonvolatile memory 1, and instructs to the nonvolatile memory 1 to activate both the ECC decoder 116b and the EMC decoder 117b.

S1605': The memory core control unit 12 reads data stored in a copy source location designated by the copy request (encoded data including user data and ECC), performs the error correction decoding process with respect to the read encoded data by using the ECC decoder 116b, and performs the error mitigating decoding process to return the data after the error correction (data encoded by the error mitigating encoding process) into the original data by using the EMC decoder 117b. Then, the memory core control unit 12 stores the original data obtained by the error mitigating decoding process in the buffer 104. Note that the memory core control unit 12 may read the data stored in the copy source location (encoded data including user data and ECC) in the buffer 104, and may execute the error correction decoding process and the error mitigating decoding process with respect to the data stored in the buffer 104.

S1608': The memory core control unit 12 encodes the data in the buffer 104 (data to which the error correction decoding process and the error mitigating decoding process are executed) by the error mitigating encoding process by using the EMC encoder 117a, and performs an error correction encoding process to add an error correction code to the data encoded by the error mitigating encoding process by using the ECC encoder 116a. Then, the memory core control unit 12 executes a program operation to write the data obtained by the error correction encoding process (encoded data obtained by the error mitigating encoding process and ECC) to the write destination page 0 of the write destination block c.

In steps S1609', S1610', and S1613', a similar process as in steps S1604', S1605', and S1608' is executed.

Figure 19:
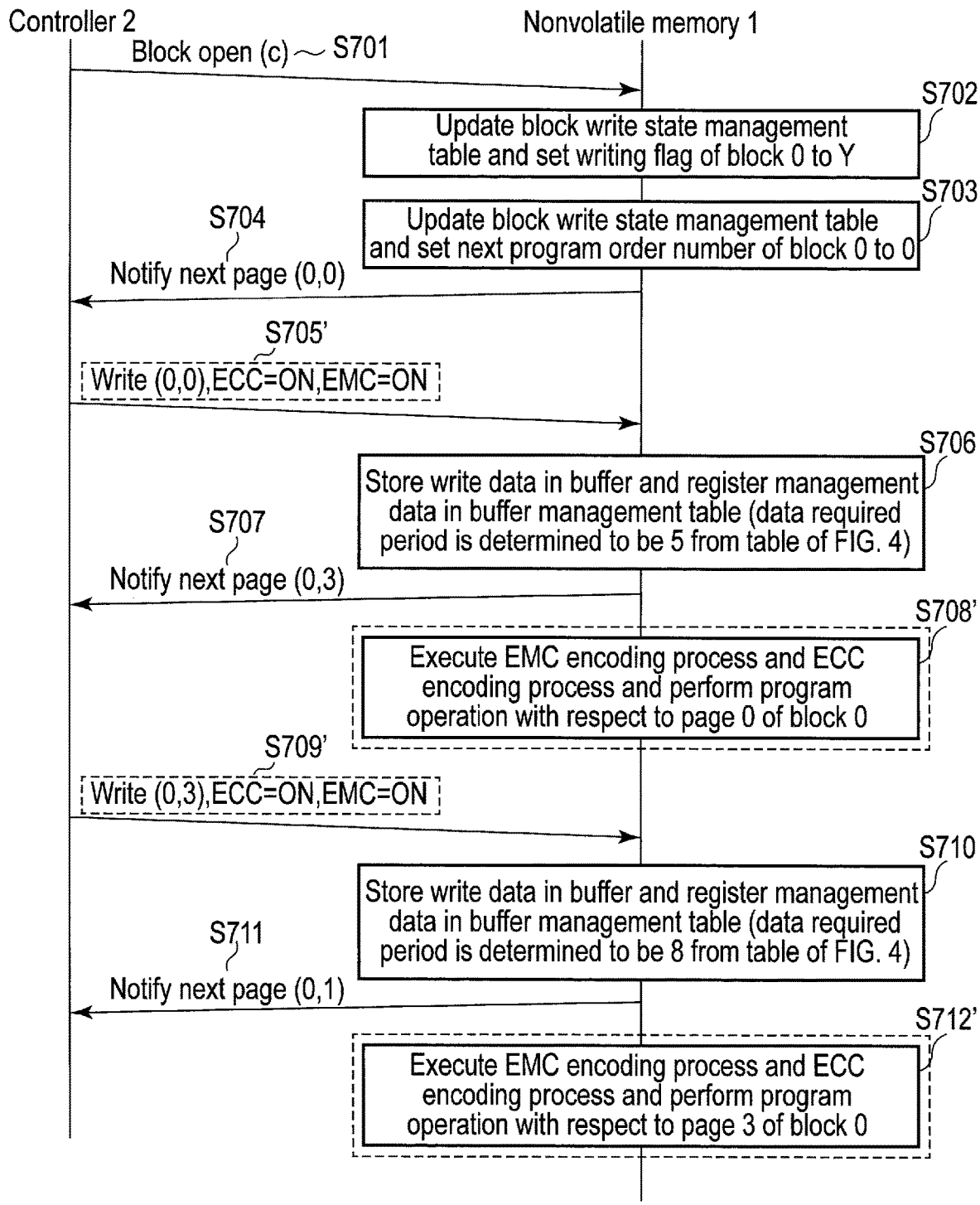
FIG. 19 is a sequence diagram illustrating another procedure of the data write process executed by the controller and the nonvolatile memory.

FIG. 19 illustrates a sequence of a data write process using the ECC processing unit 116 and the EMC processing unit 117.

In the data write process of FIG. 19, as compared to the data write process of FIG. 7A, steps S705', S708', S709', and S712' are executed instead of S705, S708, S709, and S712 of FIG. 7A. Steps S701 to S704, S706 to S1607, and S710 to S711 of FIG. 19 are the same as S701 to S704, S706 to S1607, and S710 to S711 of FIG. 7A, and thus, the description thereof will be omitted.

In the following example, considered is a case where both the ECC encoder 116a and the EMC encoder 117a are enabled in a write.

S705': Upon receipt of page address 0 of a "next page" from the nonvolatile memory 1, the controller 2 sends a program request (Write (0, 0)) designating the page address 0 and data to be written to a page having the page address 0 (data of page 0) to the nonvolatile memory 1, and instructs the nonvolatile memory 1 to activate both the ECC encoder 116a and the EMC encoder 117a.

S708': The memory core control unit 12 of the nonvolatile memory 1 encodes the data of page 0 by the error mitigating encoding process, by using the EMC encoder 117a, and performs the error correction encoding process to add an error correction code to the data encoded by the error mitigating encoding process, by using the ECC encoder 116a. Then, the memory core control unit 12 executes a program operation to write the data obtained by the error correction encoding process (encoded data obtained by the error mitigating encoding process and ECC) to page 0 of write destination block 0.

S709': Upon receipt of page address 3 of a "next page" from the nonvolatile memory 1, the controller 2 sends a program request (Write (0, 3)) designating the page address 3 and data to be written to a page having the page address 3 (data of page 3) to the nonvolatile memory 1, and instructs the nonvolatile memory 1 to activate both the ECC encoder 116a and the EMC encoder 117a.

S712': The memory core control unit 12 of the nonvolatile memory 1 encodes the data of page 3 by the error mitigating encoding process, by using the EMC encoder 117a, and performs the error correction encoding process to add an error correction code to the data encoded by the error mitigating encoding process, by using the ECC encoder 116a. Then, the memory core control unit 12 executes a program operation to write the data obtained by the error correction encoding process (encoded data obtained by the error mitigating encoding process and ECC) to page 3 of write destination block 0.

Fifth Embodiment

Now, a fifth embodiment will be explained.

A nonvolatile memory 1 and a controller 2 of the fifth embodiment are substantially the same as the nonvolatile memory 1 and the controller 2 of the fourth embodiment. However, the nonvolatile memory 1 of the fifth embodiment may not necessarily include both the ECC processing unit 116 and the EMC processing unit 117, and may include the ECC processing unit 116 but not include the EMC processing unit 117.

In the fifth embodiment, the nonvolatile memory 1 performs a process to check the number of error bits of data stored in a block designated by the controller 2.

FIG. 20 illustrates a procedure of a process to check the number of error bits, which is executed by the controller 2 and the nonvolatile memory 1.

The controller 2 initially designates a block address with respect to the nonvolatile memory 1 and requests the nonvolatile memory 1 to check the number of error bits of data stored in this block (step S2001).

In step S2001, for example, the controller 2 may send to the nonvolatile memory 1 a block check request (Block check (1)) designating a block address (for example, block address 1) of one block in the blocks in which data are written in all pages. Block check (1) is a process request to instruct to the nonvolatile memory 1 to check the number of error bits of data stored in a specific block. (1) of Block check (1) represents block address 1.

When the nonvolatile memory 1 receives the block check request (Block check (1)), the memory core control unit 12 of the nonvolatile memory 1 checks the number of error bits included in the data stored in the block 1 having the block address 1 by using the ECC decoder 116b in the nonvolatile memory 1 (step S2002).

In step S2002, the memory core control unit 12 reads the data from the block 1, performs the error correction decoding process with respect to the read data by using the ECC decoder 116b, and checks the number of error bits included in the data. Here, the number of error bits of the data is the number of erroneous bits before this data is corrected.

In the error correction decoding process, uncorrectable error may possibly occur. The maximum number of error bits correctable by the ECC decoder 116b is fixed to an upper limit value.

Which page in a block is read to check the number of error bits, how to read, and a method of error correction process may be determined by the nonvolatile memory 1, or may be preliminarily set by the controller 2 in the nonvolatile memory 1. For example, in a case where, in each block, a page in which errors are easy to be accumulated or a word line in which errors are easy to be accumulated is preliminarily known, the data may be read from the page, or may be read from each of several pages corresponding to the word line.

Then, the memory core control unit 12 performs a check result determination as to whether or not the number of error bits is within an acceptable range, on the basis of the error correction decoding process (step S2003) and returns a check result related to the number of error bits to the controller 2 (step S2004).

In step S2004, the memory core control unit 12 may notify a check result indicative of a pass or a fail of error correction of data stored in the block 1 (Notify check result (pass/fail)) to the controller 2. Or, the memory core control unit 12 may notify a check result indicative of whether or not the number of error bits of data stored in the block 1 is above the threshold value to the controller 2.

Or, if the data are read from each of pages of block 0, the memory core control unit 12 performs the error correction decoding process with respect to first data read from a page, and thereby, checks the number of error bits included in the first data. Furthermore, the memory core control unit 12 performs the error correction decoding process with respect to second data read from another page, and thereby, checks the number of error bits included in the second data. Then, among the numbers of error bits checked, the memory core control unit 12 notifies the largest number of error bits to the controller 2 as a check result.

Through the above, how the number of error bits of the data stored in the nonvolatile memory 1 is can be checked in the nonvolatile memory 1, and times of communication between the nonvolatile memory 1 and the controller 2 can be decreased, and the power can be reduced by reducing the communication data amount.

Note that the controller 2 can specify a block with a relatively large number of error bits based on the check result notified from the nonvolatile memory 1. The controller 2 may send a request to copy the data in the specified block in another block to the nonvolatile memory 1.

Sixth Embodiment

Now, a sixth embodiment will be explained.

A nonvolatile memory 1 and a controller 2 of the sixth embodiment are substantially the same as the nonvolatile memory 1 and the controller 2 of the fourth embodiment. However, the nonvolatile memory 1 of the sixth embodiment may not necessarily include both the ECC processing unit 116 and the EMC processing unit 117, and may include the ECC processing unit 116 but not include the EMC processing unit 117.

In the sixth embodiment, the controller 2 requests the nonvolatile memory 1 to set an optimal read voltage level used in the data read from the cell array 101 (may be also referred to as an optimal read level). That is, the controller 2 sends a process request instructing adjustment of a read voltage level used for reading data from the cell array 101 to the nonvolatile memory 1.

When the nonvolatile memory 1 receives the process request, the memory core control unit 12 of the nonvolatile memory 1 repeats, while changing the read voltage level applied to a certain word line (read target word), an operation to read data from memory cells connected to the word line and an operation to check the number of error bits of the read data by using the ECC decoder 116b in the nonvolatile memory 1 in order to determine a new read voltage level by which the number of error bits becomes the minimum as an optimal read voltage level.

The adjustment of the optimal read voltage level may be performed for each of the blocks. In that case, the controller 2 may designate a block address of a block optimal read voltage level of which should be adjusted to the nonvolatile memory 1. Thereby, the optimal read voltage level per block can be determined in the nonvolatile memory 1.

Hereinafter, a process to adjust a read voltage level used in the data read from the cell array 101 will be explained with reference to FIGS. 21 to 22.

In the following description, the read voltage level adjustment process will be explained while it is applied to TLC. However, the read voltage level adjustment process of the present embodiment may be applied to SLC, MLC, or QLC.

FIG. 21 illustrates a relationship between memory cell threshold voltage distribution right after being programmed and seven read voltage levels.

In TLC, each of memory cells to which 3-bit data is written is set to any one of eight states (one state and seven program states). The eight states will be referred to as state Er, state A, state B, state C, state D, state E, state F, and state G. The states Er, A, B, C, D, E, F, and G have different threshold voltage levels. The threshold voltage levels increase in the order of Er, A, B, C, D, E, F, and G.

The read voltage level to read data from the cell array 101 is set to a crossing point of two adjacent threshold voltage distributions.

That is, in the data read process, in order to separate Er, A, B, C, D, E, F, and G states from each other, one of seven threshold voltages Vth0, Vth1, Vth2, Vth3, Vth4, Vth5, and Vth6 is used as a read voltage level. The read voltage level is a voltage applied to a word line to which a set of memory cells as a read target (read target word line) is connected.

Vth0 is a voltage corresponding to a crossing point of a threshold voltage distribution corresponding to state Er and a threshold voltage distribution corresponding to state A. Vth1 is a voltage corresponding to a crossing point of a threshold voltage distribution corresponding to state A and a threshold voltage distribution corresponding to state B. Vth2 is a voltage corresponding to a crossing point of a threshold voltage distribution corresponding to state B and a threshold voltage distribution corresponding to state C. Vth3 is a voltage corresponding to a crossing point of a threshold voltage distribution corresponding to state C and a threshold voltage distribution corresponding to state D. Vth4 is a voltage corresponding to a crossing point of a threshold voltage distribution corresponding to state D and a threshold voltage distribution corresponding to state E. Vth5 is a voltage corresponding to a crossing point of a threshold voltage distribution corresponding to state E and a threshold voltage distribution corresponding to state F. Vth6 is a voltage corresponding to a crossing point of a threshold voltage distribution corresponding to state F and a threshold voltage distribution corresponding to state G.

FIG. 22 illustrates a threshold voltage distribution of each memory cell when a certain period of time has passed since each memory cell was programmed.

In FIG. 22, a threshold voltage distribution right after the program is depicted in a single-dotted line, and a current threshold voltage distribution is depicted in a solid line. The threshold voltage distribution of each memory cell when a certain period of time has passed since the program is shifted to a voltage lower than the threshold voltage distribution right after the program. Thus, threshold voltages Vth0, Vth1, Vth2, Vth3, Vth4, Vth5, and Vth6 right after the program are not optimal for the read voltage level.

Note that, in a block in which a program/erase cycle count increases, even right after the program, the threshold voltage distribution of each memory ell may be set to a low value depicted in a solid line of FIG. 22.

Figure 23:
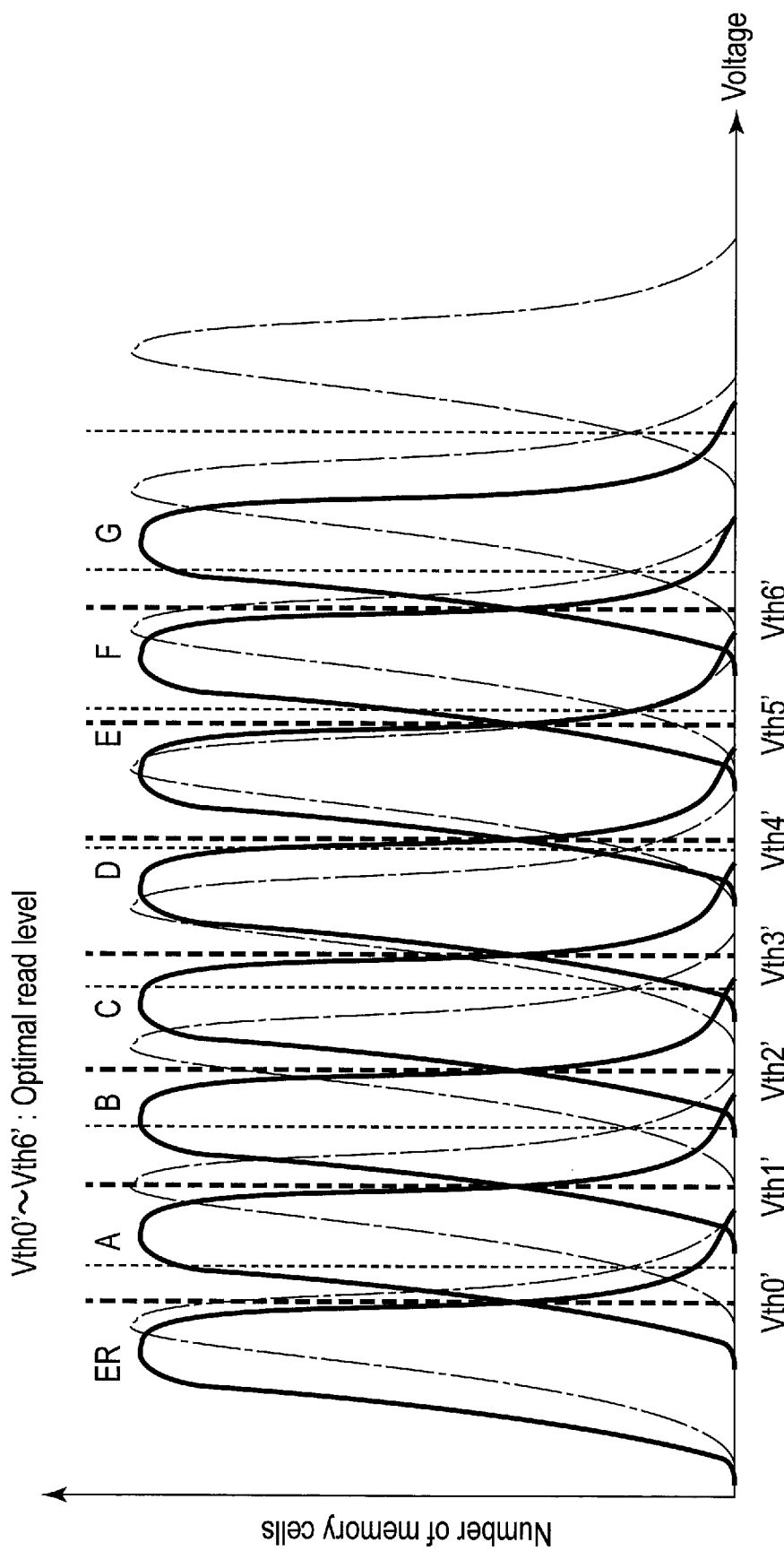
FIG. 23 is a diagram illustrating a process to determine an optimal read voltage level corresponding to the shifted threshold voltage distribution.

FIG. 23 illustrates an example of an optimal read voltage level corresponding to the shifted threshold voltage distribution of FIG. 22.

In the present embodiment, a read voltage level suitable for the shifted threshold voltage distribution is determined in the nonvolatile memory 1. In this example, threshold voltages Vth0', Vth1', Vth2', Vth3', Vth4', Vth5', and Vth6' represent optimal read voltage levels.

The threshold voltages Vth0', Vth1', Vth2', Vth3', Vth4', Vth5', and Vth6' with respect to a certain block may be determined based on, for example, the number of program/erase cycles of the block, or a time which has passed since the block was programmed.

Or, from predetermined several threshold voltage candidates, an optimal threshold voltage may be selected as an optimal read voltage level.

In that case, an optimal threshold voltage set may be selected from several threshold voltage sets (in case of TLC, each threshold voltage set includes seven threshold voltage candidates) corresponding to the number of program/erase cycles (or a time which passes from the program).

FIG. 24 illustrates a process to determine an optimal read level.

In step S2401, the controller 2 sends a process request to set an optimal read voltage level to the nonvolatile memory 1 (Set optimal read level (1)). (1) of Set optimal read level (1) represents a block address of a block to which the optimal read voltage level is set.

Upon receipt of the process request, the memory core control unit 12 of the nonvolatile memory 1 repeats, while changing the read voltage level applied to a read target word line of word lines belonging to a block 1 having a block address 1, an operation to read data from memory cells connected to the read target word line and an operation to check the number of error bits of the read data by using the ECC decoder 116b in the nonvolatile memory 1 (step S2402). Thereby, the memory core control unit 12 determines a new read voltage level by which the number of error bits becomes the minimum as an optimal read voltage level.

Then, the memory core control unit 12 stores the determined optimal read voltage level in the register or the cell array 101 in the nonvolatile memory 1 (step S2403), and notifies to the controller 2 that the optimization process is completed (step S2404).

With the above structure, the controller 2 can adjust the read voltage level such that the data retention capability of the nonvolatile memory 1 can be maximized without realizing how the nonvolatile memory 1 is structured.

Seventh Embodiment

In the seventh embodiment, a nonvolatile memory 1 includes a plurality of memory cores 11, and the nonvolatile memory 1 can operate the memory cores independently.

Figure 25:
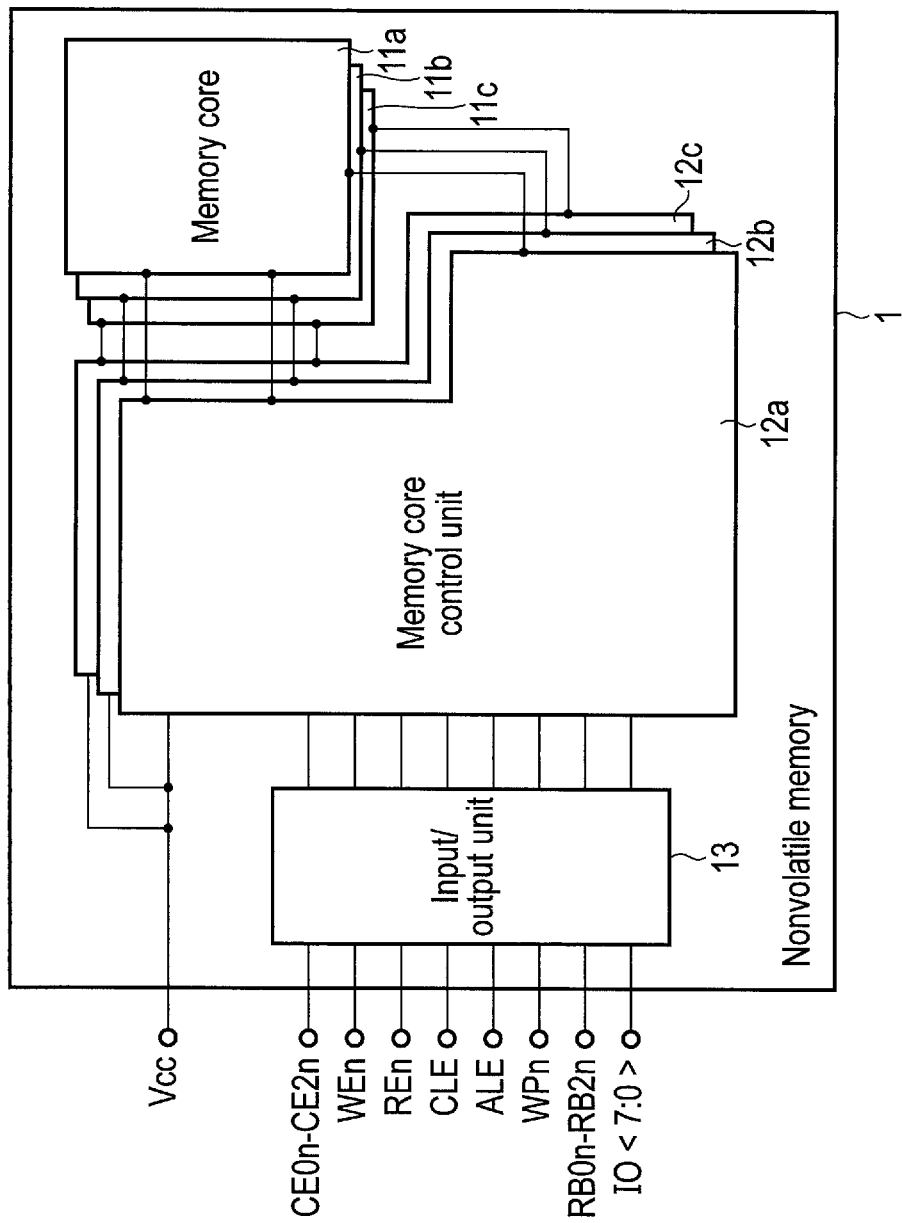
FIG. 25 is a block diagram illustrating an example of a structure of the nonvolatile memory including a plurality of memory cores and a plurality of memory core control units which control the memory cores.

FIG. 25 illustrates the structure of the nonvolatile memory 1 of the seventh embodiment.

As in FIG. 25, the nonvolatile memory 1 of the seventh embodiment includes memory cores 11a, 11b, and 11c which capable of operating independently of each other. Each of the memory cores 11a, 11b, and 11c has the same structure as the memory core 11 of FIG. 3A, and includes a cell array including a plurality of blocks.

Furthermore, the nonvolatile memory 1 includes memory core control units 12a, 12b, and 12c. The memory core control units 12a, 12b, and 12c are connected to memory cores 11a, 11b, and 11c, respectively.

The memory core control unit 12a functions as a memory core control circuit configured to control data write to the cell array in the memory core 11a and data read from the cell array of the memory core 11a.

A pair of the memory core control unit 12a and the memory core 11a can execute the same operation as the pair of the memory core 11 and the memory core control unit 12 of FIG. 3A. That is, the memory core control unit 12a has the same structure and performance as those of the memory core control unit 12 explained in the first to sixth embodiments. The pair of the memory core control unit 12a and the memory core 11a may be realized by one chip (die).

The memory core control unit 12b functions as a memory core control circuit configured to control data write to the cell array in the memory core 11b and data read from the cell array of the memory core 11b.

A pair of the memory core control unit 12b and the memory core 11b can, as above, execute the same operation as the pair of the memory core 11 and the memory core control unit 12 of FIG. 3A. That is, the memory core control unit 12b has the same structure and performance as those of the memory core control unit 12 explained in the first to sixth embodiments. The pair of the memory core control unit 12b and the memory core 11b may be realized by one chip (die) as well.

The memory core control unit 12c functions as a memory core control circuit configured to control data write to the cell array in the memory core 11c and data read from the cell array of the memory core 11c.

A pair of the memory core control unit 12c and the memory core 11c can, as above, execute the same operation as the pair of the memory core 11 and the memory core control unit 12 of FIG. 3A. That is, the memory core control unit 12c has the same structure and performance as those of the memory core control unit 12 explained in the first to sixth embodiments. The pair of the memory core control unit 12c and the memory core 11c may be realized by one chip (die) as well.

The memory core control units 12a, 12b, and 12c execute the communication with the controller 2 via the input/output unit 13 included in the nonvolatile memory 1. The memory controller communication line may include three chip enable signals CE0n-CE2n, write enable signal WEn, read enable signal REn, command latch enable signal CLE, address latch enable signal ALE, write protect signal WPn, I/O signal <7:0>, and three read/busy signals RB0n-RB2n.

In the nonvolatile memory 1 of the seventh embodiment, a pair of the memory core control unit 12a and the memory core 11a, a pair of the memory core control unit 12b and the memory core 11b, and a pair of the memory core control unit 12c and the memory core 11c can operate independently of each other. Thus, the pairs can execute the operations of the first to sixth embodiments in parallel, and thus, the write and read performance of the memory system can be sufficiently increased.

Note that, in the first to seventh embodiments, NAND flash memory is used as a nonvolatile memory. However, the function of each embodiment of the present application can be applied to various nonvolatile memories such as magnetoresistive random access memory (MRAM), phase change random access memory (PRAM), resistive random access memory (ReRAM), and ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonvolatile semiconductor memory device connectable to a controller, comprising:
   a cell array including a plurality of blocks, each of the plurality of blocks including a plurality of pages, each of the plurality of blocks being a unit for a data erase operation; and
   a control circuit configured to:
   execute program operations for a plurality of pages included in a write destination block in a certain program order, the write destination block being specified by the controller, the write destination block being included in the plurality of blocks,
   when receiving information specifying a first block of the plurality of blocks as the write destination block from the controller:
      notify a first page address of a first page included in the first block to the controller, the first page address corresponding to a next program operation to be executed with respect to the first block; and
   when receiving a write request designating the first page address from the controller, the write request being received after the first page address is notified from the control circuit to the controller:
      perform (i) an operation of notifying a second page address of a second page included in the first block to the controller, the second page address corresponding to a next program operation to be executed with respect to the first block, and (ii) a program operation of writing data to the first page in the first block.

2. The nonvolatile semiconductor memory device of claim 1, wherein the control circuit is configured to:
   in response to receiving a first process request to specify the first block of the plurality of blocks as the write destination block from the controller, notify, to the controller, a page address indicative of a page corresponding to a first program order number among the plurality of pages included in the first block as the page address corresponding to the next program operation with respect to the first block.

3. The nonvolatile semiconductor memory device of claim 2, wherein the control circuit is configured to:
   in response to receiving a program request to designate the page address of the page corresponding to the first program order number and data to be written to the page corresponding to the first program order number from the controller, notify, to the controller, a page address indicative of a page corresponding to a next program order number among the plurality of pages included in the first block as the page address corresponding to the next program operation with respect to the first block.

4. The nonvolatile semiconductor memory device of claim 1, further comprising a buffer to store data transferred from the controller, wherein
   a plurality of pages are assigned to each of a plurality of word lines belonging to the first block,
   the control circuit is configured to execute program operations for a plurality of times with respect to each word line in the first block,
   the program order is determined such that program operations corresponding to word lines adjacent to each other are executed alternately, and
   in a case where a program operation for a page address designated by a program request received from the controller is a second or succeeding program operation for a first word line in the first block, the control circuit is configured to read data used in a preceding program operation with respect to the first word line from the buffer, and execute the program operation for the first word line by using the read data and data to be written in the designated page address, the data to be written in the designated page address being transferred from the controller.

5. The nonvolatile semiconductor memory device of claim 1, wherein the control circuit is configured to:
   after receiving a program request designating a page address which is notified from the control circuit to the controller and data corresponding to a page having the designated page address from the controller, when the data corresponding to the page is no longer required in program operations for any page in the first block, notify that the data corresponding to the page is not required to the controller.

6. The nonvolatile semiconductor memory device of claim 1, further comprising a buffer to store data transferred from the controller, wherein the control circuit is configured to:
   in response to receiving a program request designating another page address which is different from a page address which is notified from the control circuit to the controller and data corresponding to the other page address from the controller, not execute a program operation for the other page address and store the received data in the buffer.

7. The nonvolatile semiconductor memory device of claim 6, wherein the control circuit is configured to:
   in response to receiving a program request designating a page address which is notified from the control circuit to the controller and data corresponding to a page having the designated page address from the controller, execute a program operation for the page having the designated page address, and
   after executing the program operation for the page having the designated page address, when data corresponding to a next page in the first block to which a next program operation is to be executed exists in the buffer, execute a program operation for the next page.

8. The nonvolatile semiconductor memory device of claim 7, wherein the control circuit is configured to:
   release an area in the buffer in which data which is no longer required in program operation for any page in the first block is stored.

9. The nonvolatile semiconductor memory device of claim 1, wherein the control circuit is configured to:
   in response to receiving a copy request designating a page address which is notified from the control circuit to the controller as a copy destination location and designating a copy source location form the controller, read data stored in the copy source location from the cell array to a buffer in the nonvolatile semiconductor memory device and execute a program operation to write the read data in the copy destination location from the buffer.

10. The nonvolatile semiconductor memory device of claim 9, further comprising an error correction code decoder, wherein the control circuit is configured to:

in a case where validation of the error correction code decoder is instructed by the controller, perform, by using the error correction code decoder, an error correction decoding process with respect to encoded data which is read from the copy source location of the cell array based on the copy request from the controller, the encoded data including data and an error correction code.

11. The nonvolatile semiconductor memory device of claim 10, further comprising an error correction code encoder, wherein the control circuit is configured to:

in a case where validation of the error correction code encoder is instructed by the controller, perform, by using the error correction code encoder, an error correction encoding process to add an error correction code to data which is to be written to the copy destination location and is error corrected by the error correction decoding process.

12. The nonvolatile semiconductor memory device of claim 1, further comprising an error correction code decoder, wherein the control circuit is configured to:

in a case where validation of the error correction code decoder is instructed by the controller, perform, by using the error correction code decoder, an error correction decoding process with respect to encoded data which is read from the cell array based on a process request from the controller, the encoded data including data and an error correction code.

13. The nonvolatile semiconductor memory device of claim 1, further comprising an error correction code encoder, wherein the control circuit is configured to:

in a case where validation of the error correction code encoder is instructed by the controller, perform, by using the error correction code encoder, an error correction encoding process to add an error correction code to data to be written to the first block.

14. The nonvolatile semiconductor memory device of claim 1, further comprising an error mitigating code decoder configured to decode data encoded by an error mitigating encoding process into original data, where the error mitigating encoding process converts a data pattern of the original data to an error-resistive data pattern, wherein the control circuit is configured to:

in a case where validation of the error mitigating code decoder is instructed by the controller, perform, by using the error mitigating code decoder, an error mitigating decoding process to return data encoded by the error mitigating encoding process, which is read from the cell array based on a process request from the controller, into original data.

15. The nonvolatile semiconductor memory device of claim 1, further comprising an error mitigating code encoder configured to perform an error mitigating encoding process to convert a data pattern of original data to an error-mitigating data pattern, wherein the control circuit is configured to:

in a case where validation of the error correction code encoder is instructed by the controller, perform, by using the error mitigating code encoder, the error mitigating encoding process to encode data to be written in the first block.

16. The nonvolatile semiconductor memory device of claim 1, further comprising:

an error correction code decoder; and an error mitigating code decoder configured to decode data encoded by an error mitigating encoding process into original data, where the error mitigating encoding process converts a data pattern of the original data to an error-resistive data pattern, wherein the control circuit is configured to:

in a case where validation of the error correction code decoder and the error mitigating code decoder is instructed by the controller, perform, by using the error correction code decoder, an error correction decoding process with respect to encoded data which is read from the cell array based on a process request from the controller, the encoded data including data and an error correction code, and perform, by using the error mitigating code decoder, an error mitigating decoding process to return the data which is error corrected into original data.

17. The nonvolatile semiconductor memory device of claim 1, further comprising:

an error correction code encoder; and an error mitigating code encoder configured to perform an error mitigating encoding process which converts a data pattern of original data to an error mitigating data pattern, wherein the control circuit is configured to:

in a case where validation of the error correction code encoder and the error mitigating code encoder is instructed by the controller, perform, by using the error mitigating code encoder, the error mitigating encoding process to encode data to be written in the first block, and performs, by using the error correction code encoder, an error correction encoding process to add an error correction code to the data encoded by the error mitigating encoding process.

18. The nonvolatile semiconductor memory device of claim 1, further comprising an error correction code decoder, wherein the control circuit is configured to:

in response to receiving from the controller a process request to instruct checking the number of error bits of data stored in a first block of the blocks, check the number of error bits included in the data stored in the first block by using the error correction code decoder, and returns a check result of the number of error bits to the controller.

19. The nonvolatile semiconductor memory device of claim 18, wherein the check result indicates whether or not the number of error bits checked is a threshold value or more.

20. The nonvolatile semiconductor memory device of claim 18, wherein the check result indicates a success or a failure of error correction of the data stored in the first block.

21. The nonvolatile semiconductor memory device of claim 18, wherein the control circuit is configured to check at least the number of error bits included in first data stored in the first block and the number of error bits included in second data stored in the first block, and return largest number of error bits to the controller as the check result.

22. The nonvolatile semiconductor memory device of claim 1, further comprising an error correction code decoder, wherein the control circuit is configured to:

in response to receiving from the controller a process request to instruct adjustment of a read voltage level used in reading of data from the cell array, determine a new read voltage level by which the number of error bits becomes a minimum, by repeating, while changing a read voltage level applied to a read target word line, reading of data from memory cells connected to the read target word line and checking of the number of error bits of read data using the error correction code decoder.

23. The nonvolatile semiconductor memory device of claim 22, wherein in a case where the process request designating adjustment of the read voltage level designates a block address of a first block of the blocks, the control circuit is configured to determine a read voltage level by which the number of error bits becomes a minimum as a read voltage level to read data from the first block, by repeating, while changing a read voltage level applied to a read target word line in word lines belonging to the first block, reading of data from memory cells connected to the read target word line and checking of the number of error bits of read data by using the error correction code decoder.

24. The nonvolatile semiconductor memory device of claim 1, wherein
the nonvolatile semiconductor memory device includes memory cores each configured to operate independently of each other and memory core control circuits each configured to control corresponding memory core,
each of the memory cores is configured to operate as the cell array, and
each of the memory core control circuits is configured to operate as the control circuit.

25. The nonvolatile semiconductor memory device of claim 1, wherein the information is a request for selecting a block among the plurality of blocks as the write destination block and is not a write request.

26. The nonvolatile semiconductor memory device of claim 1, wherein the first page address designated by the write request is based on the first page address which is notified from the control circuit to the controller.

* * * * *